(12) United States Patent
Aya et al.

(10) Patent No.: US 11,563,207 B2
(45) Date of Patent: Jan. 24, 2023

(54) METHOD OF MANUFACTURING CURRENT COLLECTOR ELECTRODE SHEET, CURRENT COLLECTOR ELECTRODE SHEET, AND BATTERY

(71) Applicant: ENVISION AESC JAPAN LTD., Kanagawa (JP)

(72) Inventors: Dai Aya, Sagamihara (JP); Mayuko Koyama, Sagamihara (JP)

(73) Assignee: ENVISION AESC JAPAN LTD., Kanagawa (JP)

(*) Notice: Subject to any disclaimer, the term of this patent is extended or adjusted under 35 U.S.C. 154(b) by 241 days.

(21) Appl. No.: 16/757,173

(22) PCT Filed: Sep. 25, 2018

(86) PCT No.: PCT/JP2018/035350
§ 371 (c)(1),
(2) Date: Apr. 17, 2020

(87) PCT Pub. No.: WO2019/077943
PCT Pub. Date: Apr. 25, 2019

(65) Prior Publication Data
US 2020/0343532 A1   Oct. 29, 2020

(30) Foreign Application Priority Data
Oct. 19, 2017   (JP) .............................. JP2017-202718

(51) Int. Cl.
*H01M 4/04* (2006.01)
*H01M 4/1391* (2010.01)
(Continued)

(52) U.S. Cl.
CPC ......... *H01M 4/1391* (2013.01); *H01M 4/043* (2013.01); *H01M 4/0404* (2013.01); *H01M 4/131* (2013.01); *H01M 4/485* (2013.01)

(58) Field of Classification Search
None
See application file for complete search history.

(56) References Cited

U.S. PATENT DOCUMENTS

| 2001/0012588 A1 | 8/2001 | Kaido et al. |
| 2006/0006063 A1 | 1/2006 | Tanaka et al. |
| 2009/0148768 A1 | 6/2009 | Tazoe |

FOREIGN PATENT DOCUMENTS

| JP | 10-12220 A | 1/1998 |
| JP | 10-214617 A | 8/1998 |

(Continued)

OTHER PUBLICATIONS

International Search Report for PCT/JP2018/035350, dated Jan. 8, 2019.

(Continued)

*Primary Examiner* — Tracy M Dove
(74) *Attorney, Agent, or Firm* — Sughrue Mion, PLLC

(57) ABSTRACT

Provided is a current collector electrode sheet (10) including a slurry application area (11) formed by intermittently applying and drying a slurry containing an active material and a non-application area (12), on both surfaces of a metal foil (9), in which the application area (11) and the non-application area (12) are alternately formed in a winding direction of the metal foil (9) having a strip shape, and, in a compression step of continuously compressing the slurry application area (11) and the non-application area (12) using a pair of compression rollers in a thickness direction of the current collector electrode sheet (10), an area which is not compressed by the compression rollers, is present in a tailing portion (14) at a terminal end (13) of each application area (11).

15 Claims, 28 Drawing Sheets

(51) Int. Cl.
*H01M 4/485* (2010.01)
*H01M 4/131* (2010.01)

(56) References Cited

FOREIGN PATENT DOCUMENTS

| | | |
|---|---|---|
| JP | 2000-208134 A | 7/2000 |
| JP | 2002-164041 A | 6/2002 |
| JP | 2004-281234 A | 10/2004 |
| JP | 2005-183181 A | 7/2005 |
| JP | 2006-024710 A | 1/2006 |
| JP | 2006-107753 A | 4/2006 |
| JP | 2006-107787 A | 4/2006 |
| JP | 2006-156102 A | 6/2006 |
| JP | 2012-009376 A | 1/2012 |
| JP | 2015-069747 A | 4/2015 |
| WO | 2005/074057 A1 | 8/2005 |

OTHER PUBLICATIONS

Extended European Search Report dated Jun. 30, 2021 from the European Patent Office in EP Application No. 18868657.0.

$x \geqq x_1$ $x < x_1$ $x \geqq x_1$ $x < x_1$

FIG. 21

METHOD OF MANUFACTURING CURRENT COLLECTOR ELECTRODE SHEET, CURRENT COLLECTOR ELECTRODE SHEET, AND BATTERY

CROSS REFERENCE TO RELATED APPLICATIONS

This application is a National Stage of International Application No. PCT/JP2018/035350 filed Sep. 25, 2018, claiming priority based on Japanese Patent Application No. 2017-202718 filed Oct. 19, 2017.

TECHNICAL FIELD

The present invention relates to a method of manufacturing a current collector electrode sheet for a stacked battery, a current collector electrode sheet, and a battery.

BACKGROUND ART

In recent years, interests in electric vehicles and hybrid vehicles increase based on environmental problems, and technical demands for high-energy density and high capacity of secondary batteries which are driving sources of the vehicles further increase.

An electrode for the secondary battery is produced from an electrode sheet acquired by applying and drying slurry containing an active material over a metal foil having a strip shape, such as aluminum or copper. It is possible to roughly classify a method of applying the active material into an intermittent coating method and a continuous coating method.

The intermittent coating method is a method of alternately forming an application area, which is formed by applying the slurry, such as the active material, to the metal foil having a strip shape, and a non-application area, to which the slurry is not applied, in a winding direction of the metal foil at prescribed intervals. A non-forming portions of an active material disposed at prescribed intervals are used as portions for drawing out a drawing tab for electrically connecting to an external terminal. In the method of manufacturing the electrode sheet according to the present invention, the slurry, which is acquired by mixing or kneading the active material that is a main material, a conductivity imparting agent, a binder, and a solution, is intermittently applied to one-side surface of the metal foil (hereinafter, referred to as an intermittent application), and, thereafter, the slurry is intermittently applied to another-side surface on an opposite side on the metal foil, thereby applying the slurry to both surfaces of the metal foil. Subsequently, rolling rollers perform pressurizing molding on the metal foil having both surfaces to which the slurry is applied. Thereafter, cutting is performed into a desired outer dimension as the current collector, and an electrode terminal portion is formed on the current collector electrode sheet.

Here, a lithium-containing composite oxide is used as a positive electrode active material of a lithium ion secondary battery, and a large pressure is required in a case where pressurizing molding is performed on an active material layer containing such metal oxide particles as main components. Particularly, in a positive electrode used for the secondary battery designed to have a high energy density, it is necessary to compress the active material layer at a high density, and thus there are many cases where molding is performed by applying much larger pressure to the pressurizing molding.

In addition, an electrode used for the secondary battery designed to have the high energy density tends to be designed such that a thickness of the metal foil, which is the current collector, is thin.

RELATED DOCUMENT

Patent Document

[Patent Document 1] Japanese Unexamined patent application publication NO. 2002-164041

SUMMARY OF THE INVENTION

Technical Problem

As illustrated in FIG. 28, in a case where slurry is intermittently applied to an application terminal end portion of the current collector electrode sheet, a slurry tailing portion 14 is easily generated at a boundary between an application area 11 and a non-application area 12. In a case where rolling processing forming is performed on an electrode sheet 10 having a strip shape by a roll press machine along a winding direction Dx of the electrode roll and the tailing portion 14 is present, an active material layer is only intermittently present in the direction Dy, which is perpendicular to the winding direction Dx, in the tailing portion 14 at the application terminal end, and thus a linear pressure, which is larger than that of a central part of the application area 11 where the active material layer is continuously present in the direction Dy perpendicular to the winding direction Dx, is applied.

In the tailing portion 14 to which a large linear pressure is applied, a phenomenon that active material particles bite into the metal foil often occurs. A residual amount of the metal foil at a part in which the active material particles bite into the metal foil is extremely thin, and thus burrs are generated in such a way that the active material layer partially falls off from a cut surface of the sheet electrode when cutting is performed in a cutting step which is subsequently performed. In a case where the generated burrs adhere to the electrode, the burrs cause a short circuit at the time of assembling the battery, and thus a problem is generated in that a failure rate of the battery increases.

In order to prevent the tailing portion 14 from being generated at the application terminal end portion when the slurry is intermittently applied as above, for example, Patent Document 1 discloses a method of applying a fluororesin to a start end and a terminal end in advance, in a winding direction Dx of a foil, of an application area to which the active material layer is applied. However, in the method, costs for applying the fluororesin increase and a weight and a thickness of an electrode increase, and thus there is problem as a method of manufacturing the electrode used for a secondary battery designed for a high energy density. Here, it is necessary to provide a manufacturing method which suppresses the generation of the burrs and provides an electrode having the low failure rate even in a case where only the active material layer is applied to the current collector electrode sheet.

The present invention has been made to solve the problems of the background art as described above, and an object of the present invention is to provide a method of manufacturing an electrode sheet capable of suppressing the generation of the burrs in a cutting step without causing an increase in manufacturing costs and the electrode sheet.

Solution to Problem

A current collector electrode sheet according to the present invention, in which an active material is applied to both surfaces of a sheet-shaped metal foil, includes a slurry application area formed by intermittently applying and drying a slurry containing the active material, and a non-application area, on the both surfaces of the metal foil, in which the application area and the non-application area are alternately formed in a winding direction of the metal foil having a strip shape, and in which, in a compression step of continuously compressing the slurry application area and the non-application area using a pair of compression rollers in a thickness direction of the current collector electrode sheet, an area, which is not compressed by the compression rollers, is present in a tailing portion at a terminal end of each application area.

A first method of manufacturing a current collector electrode sheet according to the present invention in which an active material is applied to both surfaces of a sheet-shaped metal foil, includes an application step of alternately forming a slurry application area, on which an active material layer is continuously present, and a slurry non-application area in a winding direction of the metal foil having a strip shape by intermittently applying and drying a slurry containing the active material over the metal foil having a strip shape, a first detection step of detecting a length of a tailing portion at a terminal end of each application area formed in the application step, a compression step of continuously compressing the slurry application area and the non-application area using a pair of compression rollers in a thickness direction of the metal foil on which the active materiel layer is formed, and a cutting step of continuously cutting the slurry application area and the non-application area to be parallel with the winding direction of the metal foil on the metal foil on which the active material layer is formed through the first detection step and the compression step, in which the first detection step includes detecting the tailing portion which is formed continuously from the terminal end of the slurry application area to the non-application area and which satisfies the following Equation (A), $$x \leq (2r\text{min} - t_{min}^2)^{1/2} - y_{max} - z_{max} - w_{max} \quad \text{Equation (A)},$$

in which, x is a maximum value of the length of the tailing portion at the terminal end of each application area in the application step, r is a roll diameter of the compression roller used in the compression step, $t_{min}$ is a minimum value of an assumed thickness acquired after pressurizing compression is performed in a central portion of each application area continuously formed in the application step, $y_{max}$ is a maximum value of a discrepancy amount of an application start position between both surfaces of the metal foil in the winding direction of the metal foil, $z_{max}$ is a maximum value of a discrepancy amount of an application length of the active material on both surfaces of the metal foil in the winding direction of the metal foil, and $w_{max}$ is a maximum value of a distance from a coating terminal end of the active material on both surfaces of the metal foil to a portion where a thickness of a coating film becomes the same as a center of a coating area.

A second method of manufacturing a current collector electrode sheet according to the present invention in which an active material is applied to both surfaces of a sheet-shaped metal foil, includes an application step of alternately forming a slurry application area, on which an active material layer is continuously present, and a slurry non-application area in a winding direction of the metal foil having a strip shape by intermittently applying and drying a slurry containing the active material over the metal foil having a strip shape, a detection step of detecting a length of a tailing portion at a terminal end of each application area formed in the application step, a compression step of continuously compressing the slurry application area and the non-application area using a pair of compression rollers in a thickness direction of the metal foil on which the active materiel layer is formed through the application step and the detection step, and a cutting step of continuously cutting the slurry application area and the non-application area to be parallel with the winding direction of the metal foil on which the active material layer is formed through the detection step and the compression step, in which the compression step includes compressing using a compression roller having a roll radius r that satisfies the following Equation (B), $$r \geq t_{min}/2 + (x_{max} + y_{max} + z_{max} + w_{max})^2/(2t_{min}) \quad \text{Equation (B)},$$

in which, $t_{min}$ is a minimum value of an assumed thickness after pressurizing compression is performed at a central portion of each application area continuously formed in the application step, x is a maximum value of the length of the tailing portion at the terminal end of each application area continuously formed in the application step, the length of the tailing portion being detected in the detection step, $y_{max}$ is a maximum value of a discrepancy amount of an application start position of the active material between both surfaces of the metal foil, $z_{max}$ is a maximum value of a discrepancy amount of an application length of the active material between both surfaces of the metal foil in the winding direction of the metal foil, and $w_{max}$ is a maximum value of a distance from a coating terminal end of the active material on both surfaces of the metal foil to a portion where a thickness of a coating film becomes the same as a center of a coating area.

The current collector electrode sheet of the present invention is manufactured using the above manufacturing method.

A battery of the present invention is manufactured using the current collector electrode sheet.

Note that, a random combination of the above-described components, and conversions of representation of the present invention between a method, an apparatus, a system, a recording medium, and a computer program are also effective as aspects of the present invention.

In addition, it is not essentially necessary that various components of the present invention are individually independent, a plurality of components may be formed as one member, one component may be formed by a plurality of members, some components may be a part of another component, or some of a certain component may overlap some of another component.

In addition, although the method and the computer program of the present invention are described with a plurality of procedures (or steps) in order, the described order does not limit the order in which the plurality of procedures are executed. Therefore, in a case where the method and computer program of the present invention are performed, it is possible to change the order of the plurality of procedures within a range without trouble with contents.

Further, the plurality of procedures (or steps) of the method and the computer program of the present invention are not limited to being executed at individually different timings. Therefore, another procedure may occur while a certain procedure is executed, or some or entirety of execution timing of the certain procedure and execution timing of another procedure may overlap.

Advantageous Effects of Invention

According to the invention, it is possible to provide a method of manufacturing a current collector electrode sheet, the current collector electrode sheet, and a battery, in which it is possible to suppress generation of burrs in an electrode sheet cutting step without causing an increase in manufacturing costs.

BRIEF DESCRIPTION OF THE DRAWINGS

The above-described object and other objects, features, and advantages will be further clarified by the preferred example embodiments described below and the following drawings attached thereto:

FIG. 21 is a block diagram illustrating an example of a configuration of an electrode sheet manufacturing system according to an example embodiment of the present invention.

DESCRIPTION OF EMBODIMENTS

Figure 1:
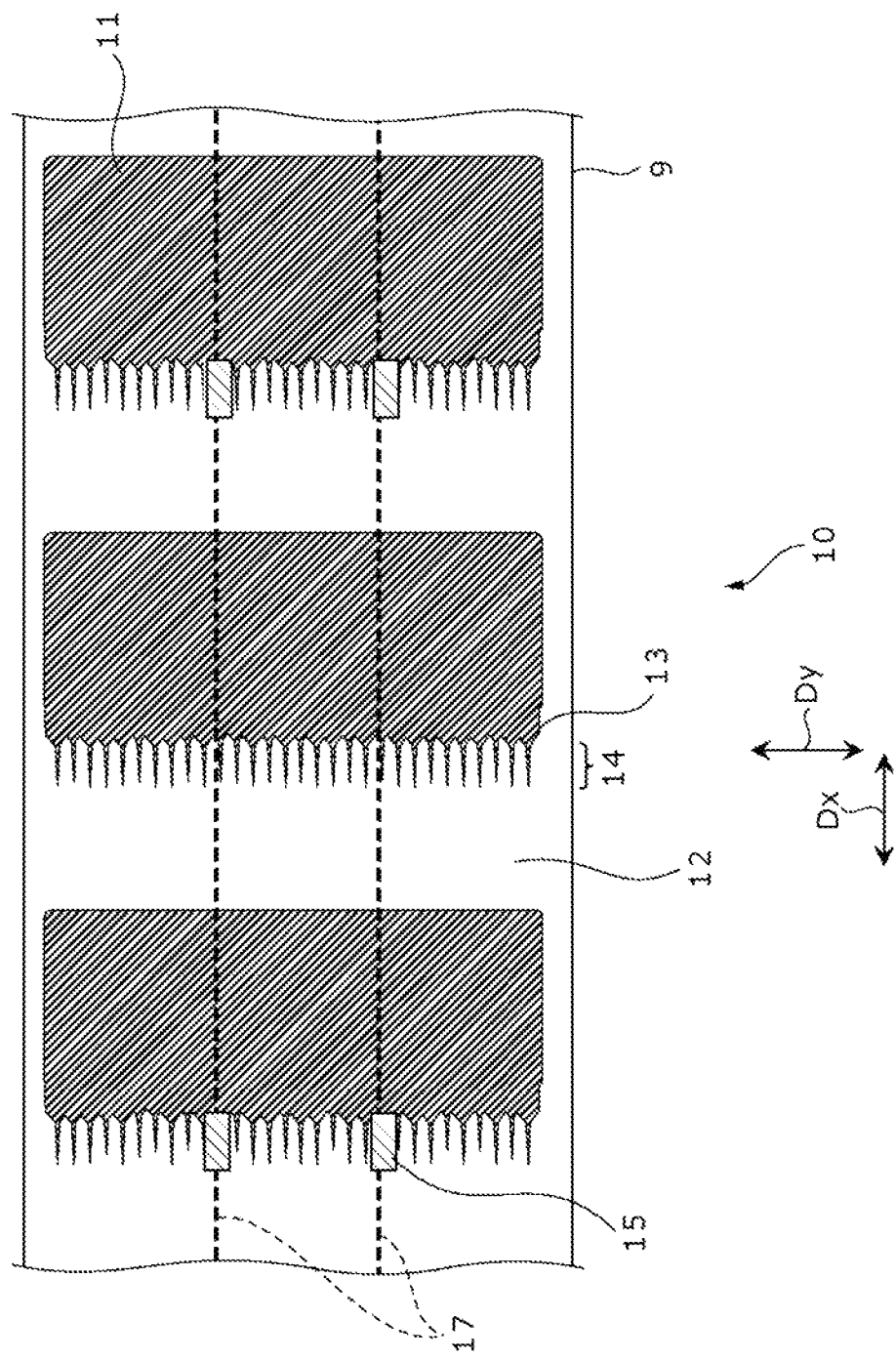
FIG. 1 is a plan view illustrating a current collector electrode sheet after application is performed on both surfaces according to a first example embodiment of the present invention.

Hereinafter, example embodiments of the present invention will be described with reference to the accompanying drawings. Also, the same components are denoted by the same reference numerals throughout all the drawings, and description thereof will not be repeated.

First Example Embodiment

FIG. 1 is a partial plan view illustrating a current collector electrode sheet 10 after an active material is applied on both surfaces in a method of manufacturing the current collector electrode sheet according to a first example embodiment of the present invention.

In the electrode sheet 10, application areas 11 of slurry, such as the active material, and non-application areas 12 are alternately and repeatedly disposed in a winding direction Dx on both surfaces of a metal foil having a strip shape. A tailing portion 14 is formed on an electrode portion on a side of a terminal end 13 of the application area 11 due to generation of a state in which the slurry is dragged. Further, in the tailing portion 14, a cutting protection layer 15 is formed at a part where a length x of a direction in which the foil of the tailing portion 14 flows, that is, the winding direction Dx is equal to or larger than the threshold $x_1$ in a region through which a line 17 (shown by a broken line in the drawing, and also referred to as a "scheduled winding direction cutting line 17" hereinafter) for cutting the electrode sheet 10 in a subsequent step.

Here, although being not particularly limited, the electrode produced from the electrode sheet 10 according to the example embodiment is, for example, an electrode (a positive electrode or a negative electrode) for a lithium ion battery such as a lithium ion primary battery or a lithium ion secondary battery.

Hereinafter, a configuration of the electrode will be described in detail.

First, each component constituting the electrode active material layer for forming the slurry application area 11 according to the example embodiment will be described.

The electrode active material layer includes an electrode active material and includes a binder resin, a conductive auxiliary agent, a thickener, and the like, if necessary. In the example embodiment, for example, it is possible to use a lithium metal composite oxide as the electrode active material.

The electrode active material contained in the electrode active material layer according to the example embodiment is appropriately selected according to a purpose. A positive electrode active material is used in a case where a positive electrode is produced, and a negative electrode active material is used in a case where a negative electrode is produced.

The positive electrode active material is not particularly limited as long as the positive electrode active material is a normal positive electrode active material that can be used for a positive electrode of the lithium ion battery. As the positive electrode active material, for example, a composite oxide of lithium and transition metal, such as a lithium-nickel composite oxide, a lithium-cobalt composite oxide, a lithium-manganese composite oxide, a lithium-nickel-manganese composite oxide, a lithium-nickel-cobalt composite oxide, a lithium-nickel-aluminum composite oxide, a lithium-nickel-cobalt-aluminum composite oxide, a lithium-nickel-manganese-cobalt composite oxide, a lithium-nickel-manganese-aluminum composite oxide, a lithium-nickel-cobalt-manganese-aluminum composite oxide; transition metal sulfide, such as $TiS_2$, FeS, or $MoS_2$; a transition metal oxide, such as MnO, $V_2O_5$, $V_6O_{13}$ or $TiO_2$; and an olivine-type lithium phosphorus oxide are given.

The olivine-type lithium phosphate oxide includes, for example, at least one type of element among a group consisting of Mn, Cr, Co, Cu, Ni, V, Mo, Ti, Zn, Al, Ga, Mg, B, Nb, and Fe, lithium, phosphorus, and oxygen. The compounds may be acquired by partially replacing some elements with other elements in order to improve properties thereof Among the above, the olivine-type lithium iron phosphorus oxide, the lithium-nickel composite oxide, the lithium-cobalt composite oxide, the lithium-manganese composite oxide, the lithium-nickel-manganese composite oxide, the lithium-nickel-cobalt composite oxide, the lithium-nickel-aluminum composite oxide, the lithium-nickel-cobalt-aluminum composite oxide, the lithium-nickel-manganese-cobalt composite oxide, the lithium-nickel-manganese-aluminum composite oxide, the lithium-nickel-cobalt-manganese-aluminum composite oxide are preferred. The positive electrode active material includes a high action potential, a large capacity, and a large energy density.

Only one type of positive electrode active material may be used alone, or two or more types of positive electrode active materials may be combined and used.

The negative electrode active material is not particularly limited as long as the negative electrode active material is a normal negative electrode active material that can be used for a negative electrode of the lithium ion battery. For example, carbon materials such as natural graphite, artificial graphite, resin charcoal, carbon fiber, activated carbon, hard carbon and soft carbon; lithium metal materials such as lithium metal and lithium alloy; metal materials such as silicon and tin; and conductive polymer materials, such as polyacene, polyacetylene, and polypyrrole, are given. Among the above, the carbon materials are preferred, and, particularly, graphite materials, such as natural graphite and artificial graphite, are preferred.

Only one type of negative electrode active material may be used, or two or more types of negative electrode active materials may be combined and used.

An average particle diameter of the electrode active material is preferably equal to or larger than 1 μm, and more preferably is equal to or larger than 2 μm, from a point of suppressing side reactions at the time of charge/discharge and suppressing a decrease in a charge/discharge efficiency, and is preferably equal to or smaller than 100 μm and more preferably is equal to or smaller 50 μm from input and output properties and a viewpoint of producing the electrode (smoothness of an electrode surface). Here, the average particle diameter means a particle diameter (median diameter: D50) at an integrated value of 50% in a particle size distribution (standard volume) by a laser diffraction scattering method.

Content of the electrode active material is preferably equal to or higher than 85 parts by mass or equal to or less than 99.8 parts by mass or less in a case where a whole of the electrode active material layer is 100 parts by mass.

The binder resin included in the electrode active material layer according to the example embodiment is appropriately selected according to the purpose. For example, it is possible to use a fluorine-based binder resin that can be dissolved in a solvent, an aqueous binder that can be dispersed in water, and the like.

The fluorine-based binder resin is not particularly limited as long as it is possible to form an electrode and sufficient electrochemical stability is included, and, for example, a polyvinylidene fluoride resin, a fluororubber, and the like are given. Only one type of fluorine-based binder resin may be used alone, or two or more types of fluorine-based binder resins may be combined and used. Here, the polyvinylidene fluoride resin is preferable. It is possible to use the fluorine-based binder resin after being dissolved in a solvent such as N-methyl-pyrrolidone (NMP).

The aqueous binder is not particularly limited as long as it is possible to form the electrode and sufficient electrochemical stability is included, and, for example, a polytetrafluoroethylene resin, a polyacrylic resin, a styrene/butadiene rubber, a polyimide-based resin, and the like are given. Only one type of aqueous binder may be used, or two or more types of aqueous binders may be combined and used. Among the above, the styrene/butadiene rubber is preferable.

Note that, in the example embodiment, the aqueous binder is dispersed in water and is capable of forming an aqueous solution of emulsion.

In a case where the aqueous binder is used, it is possible to further use the thickener. The thickener is not particularly limited, and, for example, water-soluble polymers including cellulose polymers, such as carboxymethylcellulose, methylcellulose, and hydroxypropylcellulose, and ammonium salts and alkali metal salts thereof; polycarboxylic acids; polyethylene oxide; polyvinylpyrrolidone; polyacrylate, such as sodium polyacrylate; and polyvinyl alcohol; are given.

Content of the binder resin is preferably equal to or higher than 0.1 parts by mass or and equal to or less than 10.0 parts by mass in a case where the whole of the electrode active material layer is 100 parts by mass. In a case where the content of the binder resin is included in the above range, a balance between coating properties of electrode slurry, binding properties of the binder, and battery properties is further excellent.

Further, in a case where the content of the binder resin is equal to or less than the upper limit, a ratio of the electrode active material increases, and thus a capacity per electrode mass increases, thereby being preferable. In a case where the content of the binder resin is equal to or larger than the lower limit value, it is preferable that the electrode is suppressed from being peeled.

The conductive auxiliary agent included in the electrode active material layer according to the example embodiment is not particularly limited as long as conductivity of the electrode is improved and, for example, carbon black, Ketjen black, acetylene black, natural graphite, artificial graphite, carbon fiber, and the like, are given. Only one type of conductive auxiliary agent may be used alone, or two or more types of conductive auxiliary agents may be combined and used.

It is preferable that the content of the conductive auxiliary agent is equal to or larger than 0.1 parts by mass and equal to or less than 5.0 parts by mass in a case where the whole of the electrode active material layer is 100 parts by mass.

In a case where the content of the conductive auxiliary agent is included in the above range, the balance between the coating properties of the electrode slurry, the binding properties of the binder, and the battery properties is further excellent.

In addition, in a case where the content of the conductive auxiliary agent is equal to or less than the upper limit, the ratio of the electrode active material increases, and thus the capacity per electrode mass increases, thereby being preferable. It is preferable that the content of the conductive auxiliary agent be equal to or more than the lower limit value, because the conductivity of the electrode becomes better.

In the electrode active material layer according to the example embodiment, the content of the electrode active material is preferably 85 parts by mass or more and 99.8 parts by mass or less when the whole of the electrode active material layer is 100 parts by mass. Further, the content of the binder resin is preferably equal to or more than 0.1 part by mass and equal to or less than 10.0 parts by mass. Further, the content of the conductive auxiliary agent is preferably equal to or more than 0.1 parts by mass and equal to or less than 5.0 parts by mass.

In a case where the content of each component constituting the electrode active material layer is included in the above range, the balance between the handleability of the electrode for the lithium ion battery and the battery properties of the acquired lithium ion battery is particularly excellent.

Although density of the electrode active material layer is not particularly limited, in a case where the electrode active material layer is a positive electrode active material layer, for example, it is preferable that the density is equal to or larger than 2.0 $g/cm^3$ and is equal to or less than 4.0 $g/cm^3$, it is more preferable that the density is equal to or larger than 2.4 $g/cm^3$ and is equal to or less than 3.8 $g/cm^3$, and it is furthermore preferable that the density is equal to or larger than 2.8 $g/cm^3$ and is equal to or less than 3.6 $g/cm^3$. Further, in a case where the electrode active material layer is a negative electrode active material layer, for example it is preferable that the density is equal to or larger than 1.2 $g/cm^3$ and is equal to or less than 2.0 $g/cm^3$, it is more preferable that the density is equal to or larger than 1.3 $g/cm^3$ and is equal to or less than 1.9 $g/cm^3$, and it is further more preferable that the density is equal to or larger than 1.4 $g/cm^3$ and is equal to or less than 1.8 $g/cm^3$.

In a case where the density of the electrode active material layer is included in the above range, the discharge capacity is improved when the electrode active material layer is used at a high discharge, thereby being preferable.

A thickness of the electrode active material layer is not particularly limited, and it is possible to appropriately set the thickness according to desired properties. For example, it is possible to set to be thick from a viewpoint of energy density, and it is possible to set to be thin from a viewpoint of output properties. It is possible to appropriately set the thickness (one-side thickness) of the electrode active material layer to, for example, a range which is equal to or larger than 10 μm and is equal to or less than 250 μm, it is preferable that the range is equal to or larger than 20 μm and is equal to or less than 200 μm, and it is more preferably that range is equal to or larger than 30 μm and is equal to or less than 150 μm.

Although the current collector layer (metal foil 9) according to the example embodiment is not particularly limited, it is possible to use aluminum, stainless steel, nickel, titanium, or an alloy thereof as a positive electrode current collector layer. For example, a foil, a flat plate form, a mesh form, and the like are given as a shape. In particular, it is possible to suitably use aluminum foil.

In addition, it is possible to use copper, stainless steel, nickel, titanium, or an alloy thereof as the negative electrode current collector layer. The foil, the flat plate form, the mesh form, and the like are given as a shape. In particular, it is possible to suitably use a copper foil.

A thickness of the positive electrode current collector layer is not particularly limited, and, for example, is equal to or larger than 1 μm and is equal to or less than 30 μm. In addition, a thickness of the negative electrode current collector layer is not particularly limited, and, for example, is equal to or larger than 1 μm and is equal to or less than 20 μm.

First, the electrode slurry is prepared.

It is possible to prepare the electrode slurry by mixing the electrode active material, if necessary, the binder resin, the conductive auxiliary agent, and a thickener. A combination ratio of the electrode active material, the binder resin, and the conductive auxiliary agent is the same as a containing ratio of the electrode active material, the binder resin, and the conductive auxiliary agent in the electrode active material layer, and thus the description is not repeated.

The electrode slurry is acquired by dispersing or dissolving the electrode active material, if necessary, the binder resin, the conductive auxiliary agent, and the thickener in the solvent.

Although a mixing procedure of each component is not particularly limited, for example, it is possible to prepare the electrode slurry by adding the binder resin and the solvent and performing wet mixing after performing dry mixing on the electrode active material and the conductive auxiliary agent.

At this time, as a mixer to be used, it is possible to use a known mixer, such as a ball mill or a planetary mixer, and is not particularly limited.

As a solvent to be used for the electrode slurry, it is possible to use an organic solvent, such as N-methyl-2-pyrrolidone (NMP), or water.

It is possible to use a generally known method as a method of applying the electrode slurry over the current collector layer. For example, it is possible to use a reverse roll method, a direct roll method, a doctor blade method, a knife method, an extrusion method, a curtain method, a gravure method, a bar method, a dip method, and a squeeze method. Among the above, the doctor blade method, the knife method, and the extrusion method are preferable from a point that it is possible to acquire a good surface state of the applying layer according to a physical property, such as viscosity of the electrode slurry, and a drying property.

Although a method of drying the electrode slurry applied over the current collector layer is not particularly limited, for example, a method of indirectly heating the electrode slurry from a side of the current collector layer using a heating roll or a side of the already dried electrode active material layer and drying the electrode slurry; a method of drying the electrode slurry using electromagnetic waves such as infrared, far-infrared or near-infrared heaters, and the like; and a method of indirectly heating the electrode slurry by applying hot air from the side of the current collector layer or the side of the already dried electrode active material layer and drying the electrode slurry are given.

In a case where a thickness of a metal foil 9 is denoted by d, particles are arranged in order from a particle having a smallest particle diameter among the measured active material particles when measurement is further performed using a particle size analyzer, and a diameter of the particle corresponding to 90% of the measured particles is denoted by D90, it is preferable to use a metal foil and an active material which satisfy a relationship of $D90 \geq d$.

FIG. 21 is a block diagram illustrating an example of a configuration of a manufacturing system 1 of the electrode sheet 10 according to the first example embodiment of the present invention.

The manufacturing system 1 includes a slurry application device 20, a compression device 40, and a cutting device 60. Further, a control device for controlling each device of the manufacturing system 1 may be provided.

Figure 26:
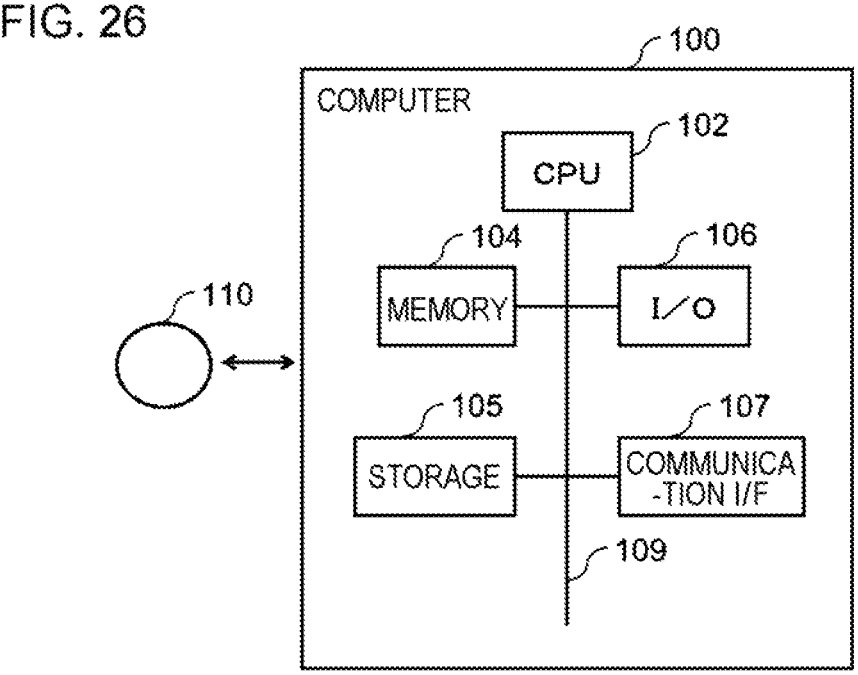
FIG. 26 is a block diagram illustrating an example of a hardware configuration of a computer that realizes each device of the electrode sheet manufacturing system according to the example embodiment of the present invention.

FIG. 26 is a block diagram illustrating an example of a hardware configuration of a computer that realizes each device of the electrode sheet manufacturing system according to the example embodiment of the present invention.

Each of the slurry application device 20, the compression device 40, and the cutting device 60 is realized by at least one computer 100. The computer 100 includes a Central Processing Unit (CPU) 102, a memory 104, a program 110 for realizing each device loaded in the memory 104, a storage 105 for storing the program 110, an Input and Output (I/O) 106, and a communication interface (I/F) 107 for network connection. The CPU 102 and each element are connected to each other through a bus 109, and an entirety of the computer 100 is controlled by the CPU 102. However, a method of connecting the CPU 102 and the like to each other is not limited to bus connection.

In a case where the CPU 102 reads out and executes the program 110 stored in the storage 105 in the memory 104, it is possible to realize each function of each device.

The slurry application device 20, the compression device 40, and the cutting device 60 are realized, respectively, through a random combination of hardware and software of the computer 100. Further, those skilled in the art understand that there are various modifications for a realization method and an apparatus thereof.

The program 110 may be recorded on a recording medium readable by the computer 100. The recording medium is not particularly limited, and various forms are conceivable. In addition, the program may be loaded into the memory 104 of the computer 100 from the recording medium, or may be loaded into the memory 104 after being downloaded to the computer 100 through a network.

The recording medium that records the program 110 includes a non-transitory type computer-readable medium that can be used by the computer 100, and a program code that can be read by the computer 100 is embedded therein. In a case where the program 110 is executed on the computer 100, the program causes the computer 100 to execute the method of manufacturing the electrode sheet 10 for implementing each device.

Figure 22:
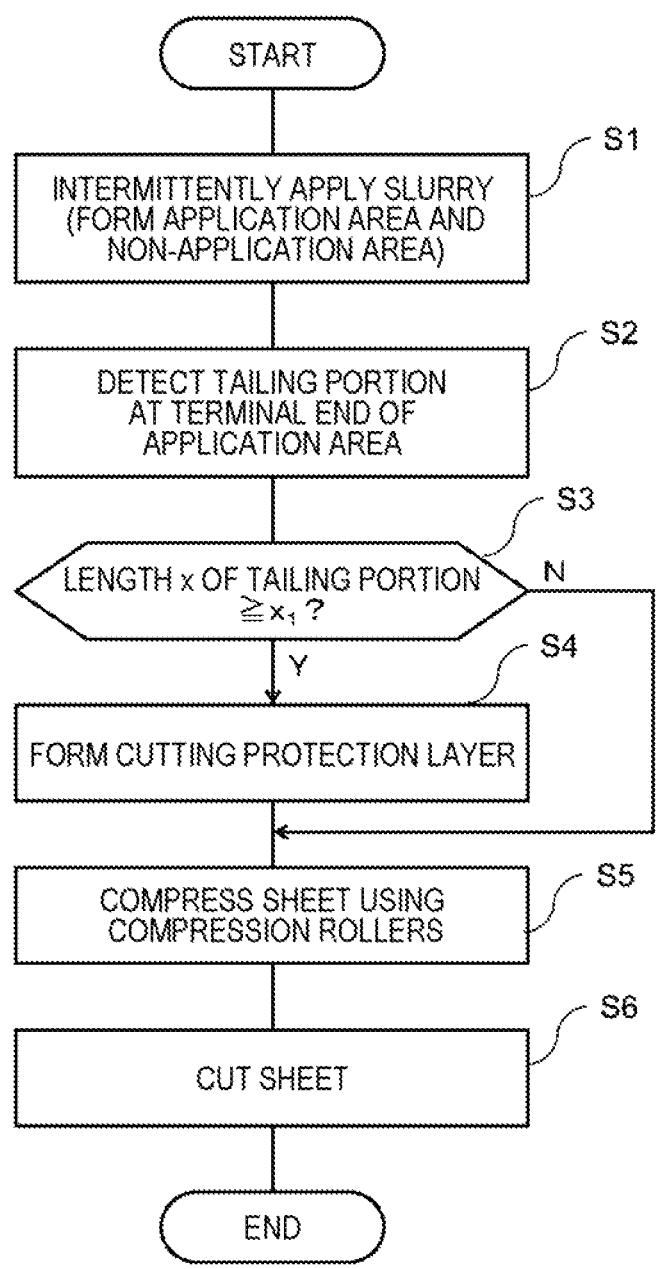
FIG. 22 is a flowchart illustrating steps of a method of manufacturing the electrode sheet according to the example embodiment of the present invention.

FIG. 22 is a flowchart illustrating steps of the method of manufacturing the electrode sheet 10 according to the first example embodiment of the present invention.

The method of manufacturing the electrode sheet 10 according to the first example embodiment of the present invention includes an application step (S1), a first detection step (S2), a cutting protection layer forming step (S4), a compression step (S5), and a cutting step (S6). The electrode sheet 10 according to the example embodiment of the present invention is manufactured by the manufacturing method illustrated in FIG. 22. Details of each step will be described later, together with a description of each device.

Figure 2:
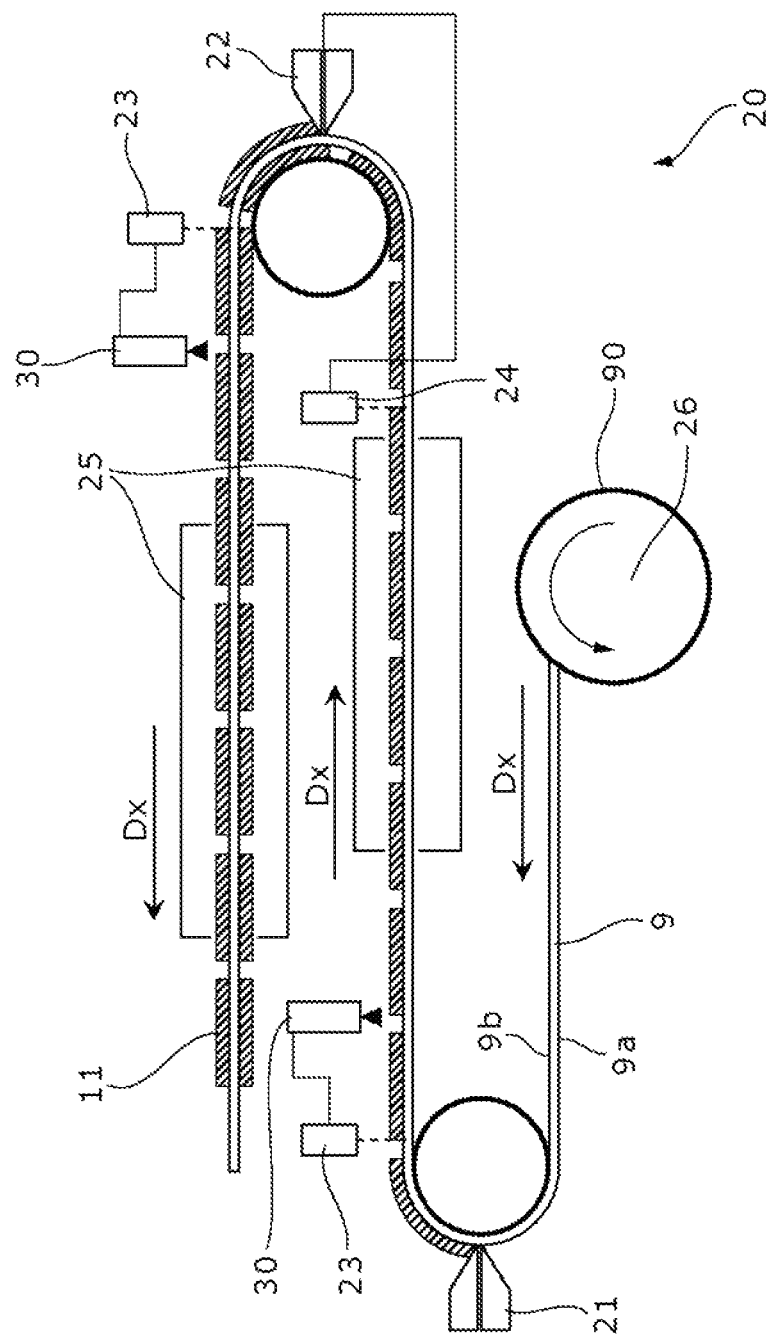
FIG. 2 is a schematic diagram illustrating an outline of a slurry application device for an electrode sheet according to the first example embodiment of the present invention.

FIG. 2 is a schematic diagram illustrating an outline of the slurry application device 20 for the electrode sheet according to the first example embodiment of the present invention.

First, in the application step (S1 in FIG. 22), on the metal foil 9 installed in the application device 20, an active material (slurry) application area 11 is formed by intermittently applying and drying the slurry including the active material on one surface 9a using, for example, a first die coater 21 or the like.

As described above, in a case where the die coater 21 or the like is used to form the application area 11, the slurry is not sharply cut at a moment of transition from the application area 11 to the non-application area 12 when the application of the active material (slurry) is blocked due to influence of marginal performance of the application device 20 and the like. Therefore, a state in which the slurry is dragged occurs at an electrode part on the side of the terminal end 13 of the application area 11, and the tailing portion 14 (FIG. 1) is generated.

The application device 20 includes a terminal end detector 23, a start end detector 24, and a cutting protection layer discharger 30. Subsequent to the application step (S1 in FIG. 22) for forming the application area 11 of the active material (slurry), the terminal end detector 23 detects a length of the tailing portion 14 of the application area 11 formed on each surface of the metal foil 9 in a first detection step (S2 in FIG. 22). In the example of FIG. 2, each of the two terminal end detectors 23 detects the length of the tailing portion 14 on each surface of the metal foil 9. The cutting protection layer discharger 30 forms the cutting protection layer 15 on the tailing portion 14 in conjunction with the terminal end detector 23.

Figure 23:
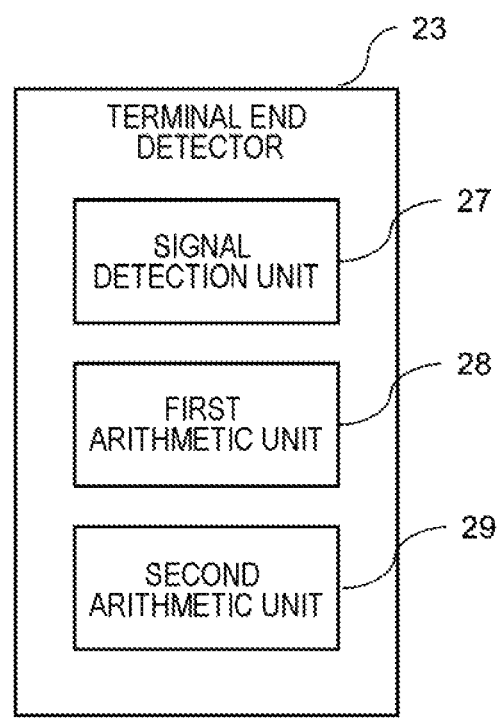
FIG. 23 is a functional block diagram illustrating an example of a configuration of a terminal end detector of a slurry application device used in the method of manufacturing the electrode sheet according to the example embodiment of the present invention.

As illustrated in FIG. 23, for example, the terminal end detector 23 includes a signal detection unit 27 that irradiates one surface (9a or 9b) of the electrode sheet 10 with laser light or the like, and detects a signal which receives reflecting light, a first arithmetic unit 28 that processes the acquired signal, and calculates a length of a direction in which a foil of each tailing portion 14 flows, that is, the winding direction Dx, and a second arithmetic unit 29 that determines whether x is equal to or larger than a threshold $x_1$ in a case where the length of the tailing portion 14 detected using the above-described method is set to x.

The threshold $x_1$ used in the above determination performed by the second arithmetic unit 29 is a value represented in the following equation (1).

$$x_1 = (2rt - t^2)^{1/2} - y_{max} - z_{max} - w_{max} \tag{1}$$

Here, each value of Equation (1) will be described with reference to FIGS. 24A and 24B.

Figures 24A, 24B:
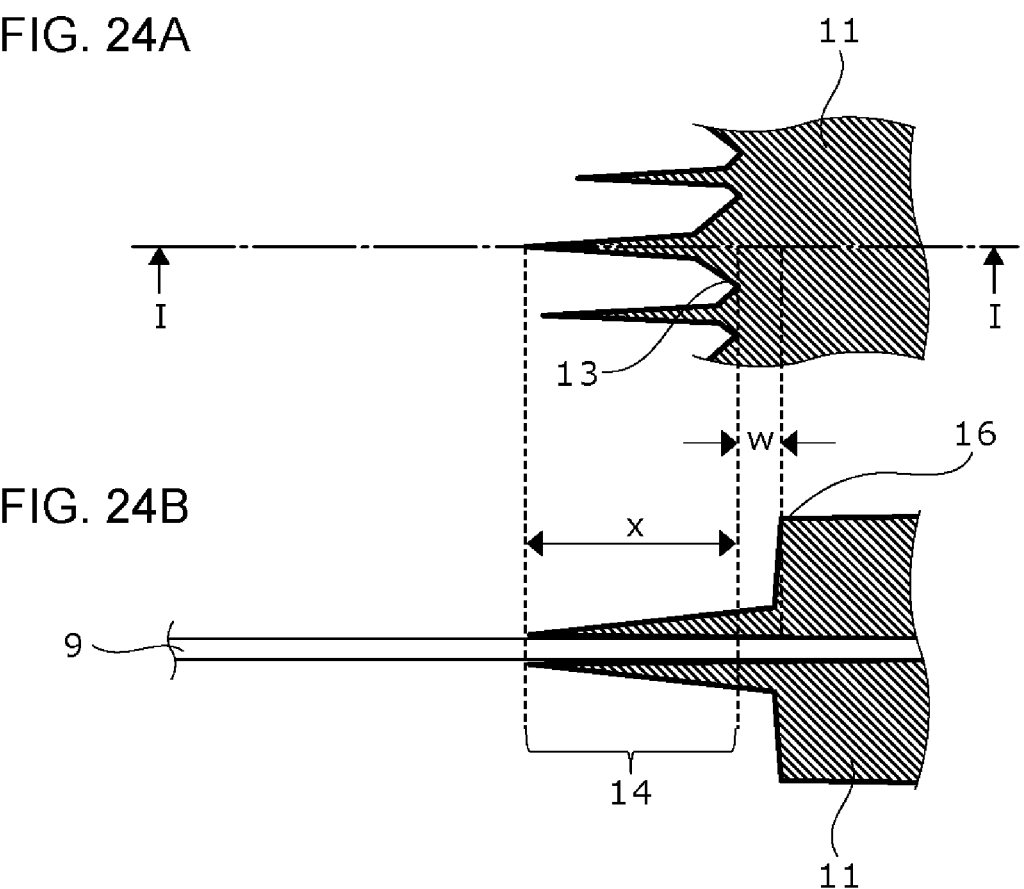
FIGS. 24A and 24B are diagrams illustrating a relationship between a plane and a cross section viewed from the upper surface of the current collector electrode sheet acquired after the application is performed on the both surfaces according to the first and second example embodiments of the present invention.

FIG. 24A is a top diagram illustrating the electrode sheet 10 including a part of the active material application area 11 formed on the electrode sheet 10, and FIG. 24B is a cross-sectional diagram illustrating the electrode sheet 10 on which the application area 11 is formed for a line I-I of FIG. 24A.

r is a roll radius of the compression roller used in a compression step (S5 in FIG. 22) of a subsequent step.

t is an estimated average thickness of a central portion of the application area 11 acquired after the compression step (S5 in FIG. 22) of the subsequent step.

$y_{max}$ is a maximum value of a discrepancy amount y, in the winding direction of the metal foil 9, of an application start position of the active material (slurry) of each application area 11 successively formed on the both surfaces of the metal foil 9.

$z_{max}$ is a maximum value of a discrepancy amount z of the application length in the winding direction of the metal foil 9 of the active material (slurry) of each application area 11 successively formed on the both surfaces of the metal foil 9.

$w_{max}$ is a maximum value of a distance w in the winding direction of the metal foil 9 from a coating terminal end 13 of the active material (slurry) of each application area 11 successively formed on the both surfaces of the metal foil 9 to a terminal end 16 in which a thickness of the coating film becomes the same thickness as a center of the coating area.

In the cutting protection layer forming step (S4 in FIG. 22), in a case where a value, in which the length x in a direction in which the foil of the tailing portion 14 flows, that is, the winding direction Dx is equal to or larger than the threshold $x_1$, is detected by the terminal end detector 23 (Y in S3 in FIG. 22), a signal is sent from the second arithmetic unit 29 to the cutting protection layer discharger 30, and the cutting protection layer 15 is applied to the tailing portion 14 and is dried. In a case where a value, in which the length x of the tailing portion 14 is equal to or larger than the threshold $x_1$, is not detected (N in S3 in FIG. 22), the cutting protection layer forming step (S4 in FIG. 22) is bypassed, and the processing proceeds to the cutting step (S6 in FIG. 22).

Here, the cutting protection layer 15 may be applied to at least a vicinity where cutting is performed in the subsequent cutting step (S6 in FIG. 22). Therefore, a position, at which the terminal end detector 23 detects the length of the tailing portion 14, may be at least a scheduled winding direction cutting line 17 in FIG. 1 and a peripheral portion thereof (for example, a range having a width of 3 mm including the scheduled winding direction cutting line 17 along the scheduled winding direction cutting line 17), and may be a position at which it is possible to detect the length of the tailing portion 14.

The cutting protection layer 15 may cover at least a whole tailing portion 14 from the tailing start portion of the electrode portion on the side of the terminal end 13 of the application area 11 in the direction in which the foil flows, that is, the winding direction Dx, such that at least a part of the non-application area 12 is applied. It is preferable that the length of the cutting protection layer 15 in the direction in which the foil flows, that is, the winding direction Dx, is about 8 mm.

In addition, it is preferred that, in the direction Dy perpendicular to the direction in which the foil flows, that is, the winding direction Dx, a width of the detection area by the terminal end detector 23 and a width of the cutting protection layer 15 are about 3 mm by taking the tolerance of a cutting machine into consideration.

In addition, although a material of the cutting protection layer 15 is not particularly limited, the material may have a thickness and a strength capable of reinforcing a foil at a cutting spot and suppressing or preventing breakage (generation of cut burrs) in a cutting step which will be described later, and it is preferable to select, for example, an ultraviolet curable resin as the material of the cutting protection layer 15.

More specifically, the cutting protection layer 15 is not particularly limited as long as the cutting protection layer 15 has a strength capable of reinforcing an area of an intersection X and preventing a concave-convex structure B from falling off at the time of cutting a laminated body (battery 150), and for example, a resin layer, such as a thermoplastic resin layer, an ionizing radiation-curable resin layer, and a thermosetting resin layer, and an ink layer formed by ink may be given.

Although the thermoplastic resin for forming the thermoplastic resin layer is not particularly limited, for example, (meth) acrylic resins such as polymethyl (meth) acrylate and polyethyl (meth) acrylate; polyolefin-based resins such as polypropylene and polyethylene; polycarbonate resins; vinyl chloride resin; polyethylene terephthalate (PET); acrylonitrile-butadiene-styrene resin (ABS resin); acrylonitrile-styrene-acrylate resin; fluorine resins such as polyvinylidene fluoride and polytetrafluoroethylene are given. One type of thermoplastic resin may be used alone or two or more types of thermoplastic resins may be combined and used.

Although the ionizing radiation-curable resin for forming the ionizing radiation-curable resin layer is not particularly limited, for example, an unsaturated polyester resin, an acrylate resin, a methacrylate resin, and a silicone resin may be given. One type of ionizing radiation-curable resin may be used alone, or two or more types of ionizing radiation-curable resins may be combined and used.

Here, the ionizing radiation-curable resin is a resin which cures in a case of being irradiated with ionizing radiation. The ionizing radiation used for curing the ionizing radiation-curable resin layer is not particularly limited, and it is possible to use the ionizing radiation which acts and ionizes (radicalizes) the ionizing radiation-curable resin, a photo-radical polymerization initiator added to the ionizing radiation-curable resin layer, a sensitizer, and the like, and which has sufficient energy to initiate a radical polymerization reaction. For example, it is possible to use electromagnetic waves, such as visible light, ultraviolet light, X-rays, and γ-rays, and charged particle beams, such as electron beams, α-rays, and β-rays, and the ultraviolet rays and the electron beams are preferable from a viewpoint of sensitivity, curing ability, and simplicity of an irradiation device (a light source and a line source).

Although the thermosetting resin for forming the thermosetting resin layer is not particularly limited, for example, a melamine-based resin, a phenol-based resin, a urea-based resin, an epoxy-based resin, an aminoalkyd-based resin, a urethane-based resin, a polyester-based resin, and a silicone-based resin are given. One type of thermosetting resin may be used alone or two or more types of thermosetting resins may be combined and used.

The ink for forming the ink layer is not particularly limited as long as it is possible to form an ink layer which has a strength capable of reinforcing the area of the intersection X and preventing the concave-convex structure B from falling off at the time of cutting a laminated body (electrode sheet 10), and it is possible to appropriately select a known ink.

The thickness of the cutting protection layer 15 is not particularly limited as long as the thickness is capable of reinforcing the area of the intersection X and preventing the concave-convex structure B from falling off at the time of cutting the electrode sheet 10, for example, it is preferable that the thickness is equal to or larger than 1 μm and equal to or less than 50 μm, and it is more preferable that the thickness is equal to or larger than 3 μm and equal to or less than 30 μm.

It is possible to form the cutting protection layer 15 by, for example, applying a resin composition or an ink for forming the resin layer or the ink layer in a vicinity of the intersection X, and, subsequently, drying and/or curing the resin composition or the ink.

A method of applying the resin composition or the ink is not particularly limited, and, for example, it is possible to use a coating method such as a gravure coating method, a die coating method, a lip coating method, a knife coating method, an air knife coating method, a spray coating method, a flow coating method, a roll coating method, a dip coating method, and an inkjet method. The methods may be used alone or may be combined and used. Here, the ink jet method is preferable from a point that it is possible to continuously form the cutting protection layer 15 only in the vicinity of the intersection X.

In this manner, after drying the electrode sheet 10 applied with active material application areas 11 and the cutting protection layers 15 at spots, of which the length x is equal to or larger than the threshold $x_1$, in the tailing portion 14 on one-side surface 9a of the metal foil 9 through a drier 25, the active material application areas 11 and the cutting protection layers 15 are formed on another-side surface 9b of the metal foil 9 in the same manner. At this time, on the other-side surface 9b, the start end detector 24 detects the position of the active material application area formed on the one-side surface 9a. The active material application areas 11 are formed at portions of the other-side surface 9b, which is a back surface of the one-side surface 9a, of positions corresponding to the positions detected on the one-side surface 9a, using the die coater 22 that operates by receiving a detection signal of the start end detector 24, and thus each of the positions of the active material application areas 11 formed on the both surfaces of the electrode sheet 10 matches. In addition, an application start position and an application end position of the active material (slurry) are also matched on both surfaces of the electrode sheet 10, respectively. The positional discrepancy amount y at the start of application of the active material (slurry) between the both surfaces of the electrode sheet 10 is adjusted to be, for example, less than 1 mm in the winding direction Dx.

Figure 3:
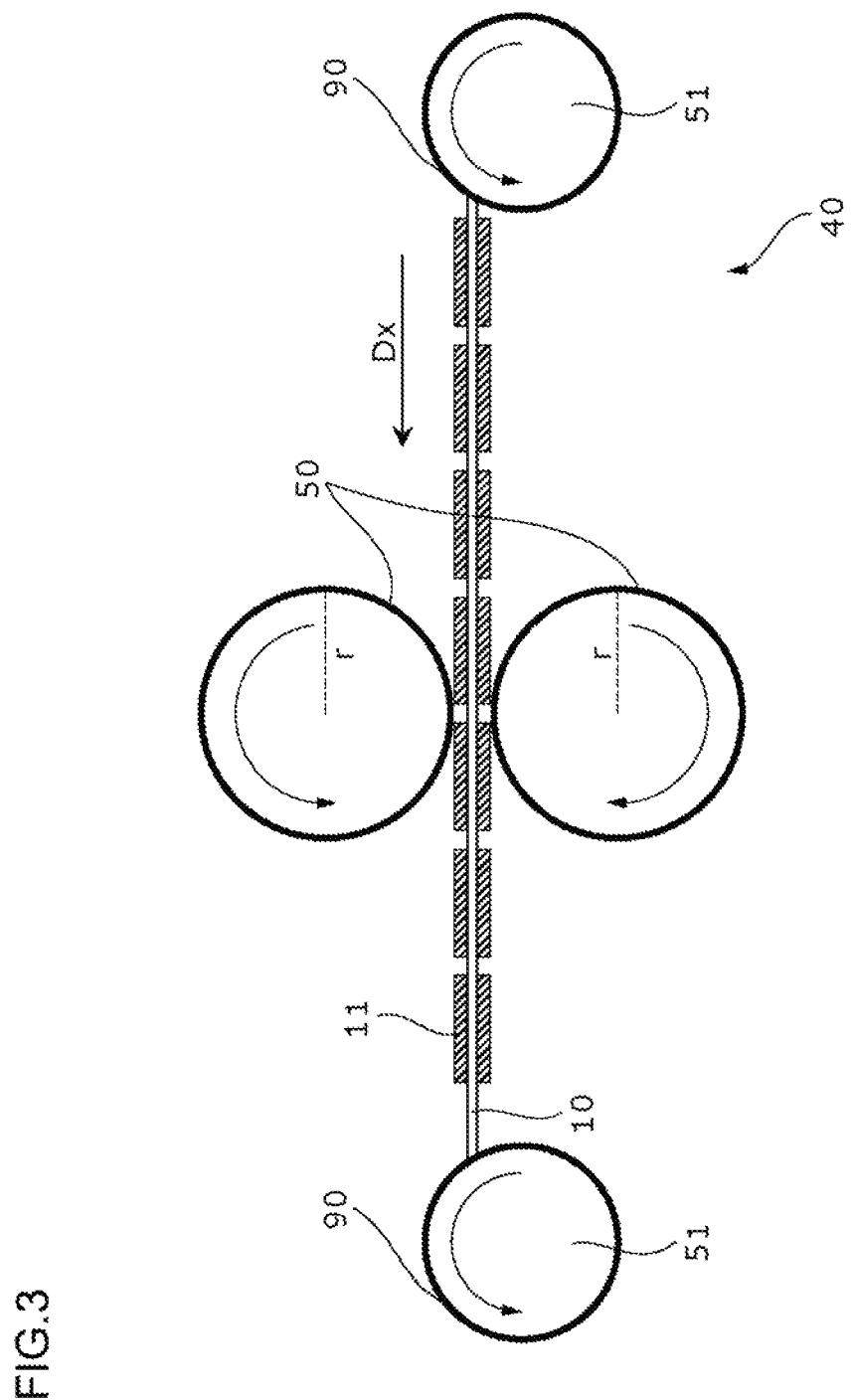
FIG. 3 is a schematic diagram illustrating an outline of an electrode sheet compression device according to the example embodiment of the present invention.

FIG. 3 is a schematic diagram illustrating an outline of the compression device 40 of the electrode sheet 10 according to the first example embodiment of the present invention.

In the compression step (S6 in FIG. 22), the electrode sheet 10, in which the active material application areas 11 and the cutting protection layers 15 are formed on the both surfaces of the metal foil 9 by the slurry application device 20 illustrated in FIG. 2, is compressed by a pair of compression rollers 50 illustrated in FIG. 3. The electrode sheet 10 is pressurized and compressed at the time of passing through a gap between the pair of compression rollers 50, and is wound in the winding direction Dx.

Note that, in the compression step (S6 in FIG. 22), the direction in which the electrode sheet 10 flows, that is, the winding direction Dx may be set from a side of an application terminal end to a side of an application start end, on the contrary, may be set from the side of the application start end to the side of the application terminal end.

In the compression step (S6 in FIG. 22), it is preferable that the compression device 40 applies pressure such that a load applied to a central portion of the application area 11 becomes a pressure exceeding 1.5 ton/cm in the metal foil 9 on which the active material layer is formed.

Figure 4:
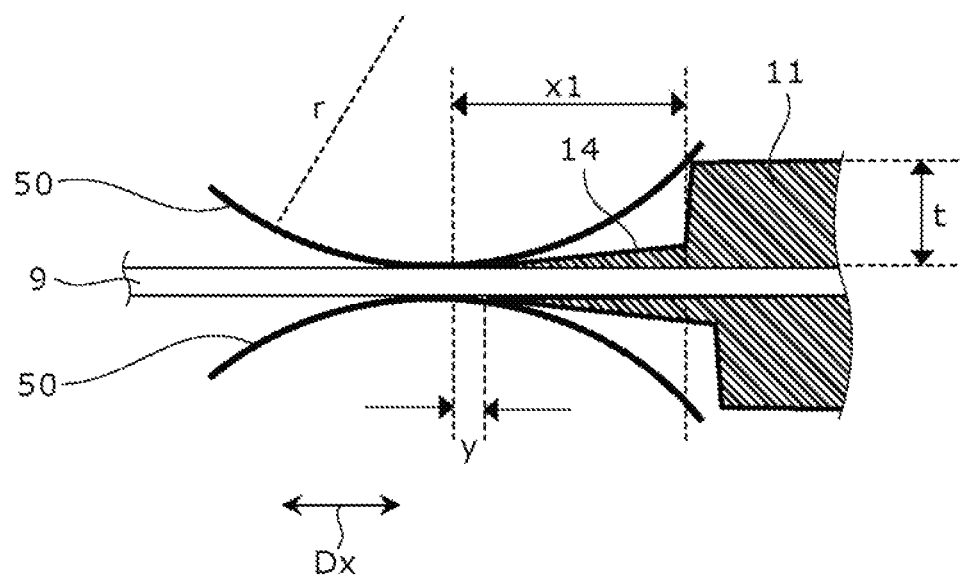
FIG. 4 is a cross-sectional diagram illustrating a relationship between a current collector electrode sheet after application is performed on the both surfaces and a compression roller according to the first and second example embodiments of the present invention.

FIG. 4 is a cross-sectional diagram illustrating a relationship between the current collector electrode sheet 10 and the compression rollers 50 after the application is performed on the both surfaces according to the first example embodiment of the present invention.

In a case where the compression rollers 50 compress the application area 11, the compression rollers 50 do not contact with the electrode sheet 10 in a range of a fixed length $x_1$ in the direction in which the metal foil 9 flows from the electrode portion on the side of the terminal end 13 of the application area 11, that is, in the winding direction Dx, but a region that the compression rollers 50 very slightly come into contact with the electrode sheet 10.

As described above, the electrode sheet 10 manufactured in the example embodiment includes an area that is not compressed by the compression rollers 50 in the tailing portion 14 at the terminal end 13 of each application area 11.

Here, as a result of earnest study, the inventors find that the threshold x1 is represented by the following Equation (2).

$$x_1 = (2rt_{min} - t_{min}^2)^{1/2} - y_{max} - z_{max} - w_{max} \quad (2)$$

Here, r, $y_{max}$, $z_{max}$, and $w_{max}$ are the same as the above-described Equation (1).

$t_{min}$ is a minimum value of an assumed thickness t after pressurizing compression are performed in the central portion of each application area 11 continuously formed by applying the slurry containing the active material in the application step (S1 in FIG. 22).

That is, in a case where the length x in the direction in which the foil of the tailing portion 14 flows, that is, the winding direction Dx is less than the threshold $x_1$, the compression rollers 50 do not come into contact with the electrode sheet 10 in the compression step (S5 in FIG. 22), and thus linear pressure is not applied to the tailing portion 14. Therefore, as illustrated in the cross-sectional diagram of FIG. 5, the active material particles 70 hardly bite into the metal foil. Therefore, the thickness of the metal foil 9 in the tailing portion 14 is almost equal to the thickness of the metal foil 9 in the non-application area 12 of the slurry such as the active material.

Figure 6:
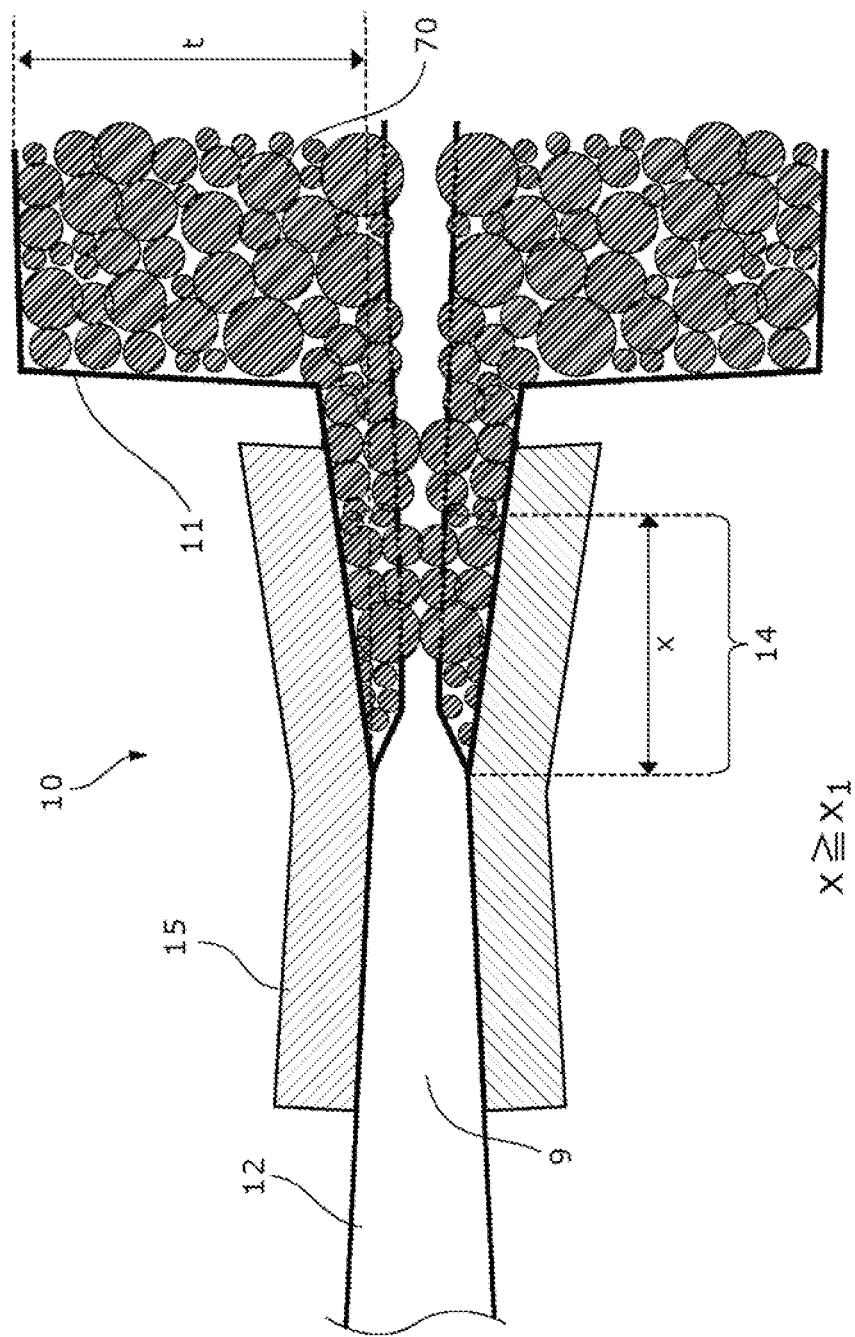
FIG. 6 is a cross-sectional diagram illustrating a part, at which the cutting protection layer is applied to the tailing portion after application is performed, of the current collector electrode sheet after the pressurizing molding is performed according to the first example embodiment of the present invention.

On the other hand, as illustrated in the cross-sectional diagram in FIG. 6, in a case where the length x in the direction in which the foil of the tailing portion 14 flows, that is, the winding direction Dx is equal to or larger than the threshold $x_1$, the compression rollers 50 come into contact with the electrode sheet 10 in the compression step (S5 in FIG. 22). The tailing portion 14 has an active material layer which is only intermittently present in the direction in which the foil flows, that is, the direction Dy which is perpendicular to the winding direction Dx as illustrated in FIG. 1, and thus the linear pressure, which is locally larger than that of the active material application area 11 in which the active material layer is continuously present, is applied in the direction in which the foil flows, that is, the direction Dy which is perpendicular to the winding direction Dx. Therefore, as illustrated in the cross-sectional diagram in FIG. 6, in the tailing portion 14, the active material particles bite into the metal foil 9, and thus a residual amount of the metal foil 9 becomes extremely thin.

Figure 7:
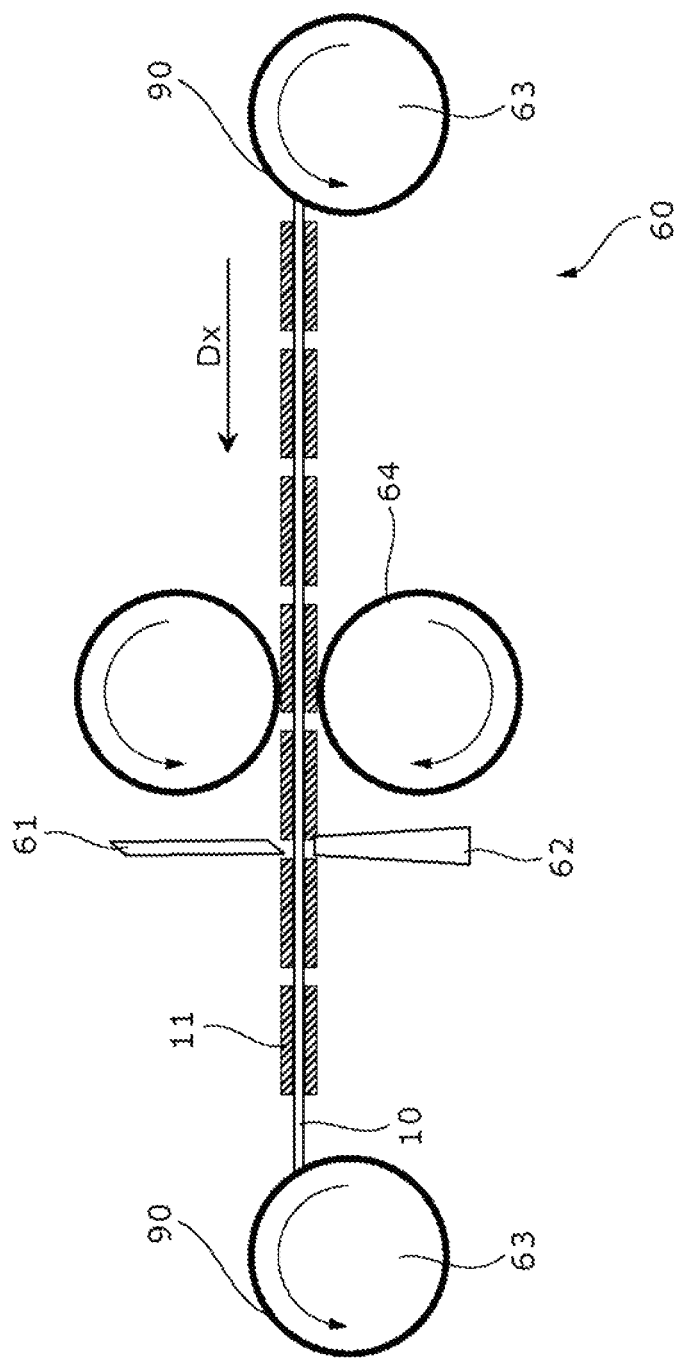
FIG. 7 is a schematic diagram illustrating an outline of a cutting device for cutting an electrode sheet into a plurality of sheets according to the example embodiment of the present invention.

FIG. 7 is a schematic diagram illustrating an outline of the cutting device 60 according to each example embodiment of the present invention.

The cutting device 60 cuts the electrode sheet 10 into a plurality of sheets. The cutting device 60 includes a first cutting blade 61, a second cutting blade 62, two backup rollers 63, and a pair of guide rollers 64.

It is possible to acquire a plurality of electrodes by cutting the electrode sheet 10 by a prescribed size. Although the method of cutting out the electrodes from the electrode sheet 10 is not particularly limited, and, for example, a method of cutting the electrodes in parallel with a longitudinal direction of the electrode sheet 10 (cutting along the scheduled winding direction cutting line 17 in FIG. 1) and cutting a plurality of electrodes having a prescribed width is given. Further, it is possible to acquire an electrode for a battery by punching into a prescribed dimension according to the purpose.

Here, a method of cutting the electrode sheet 10 is not particularly limited, and, for example, it is possible to cut the electrode sheet 10 using a blade formed of a metal.

Figure 8:
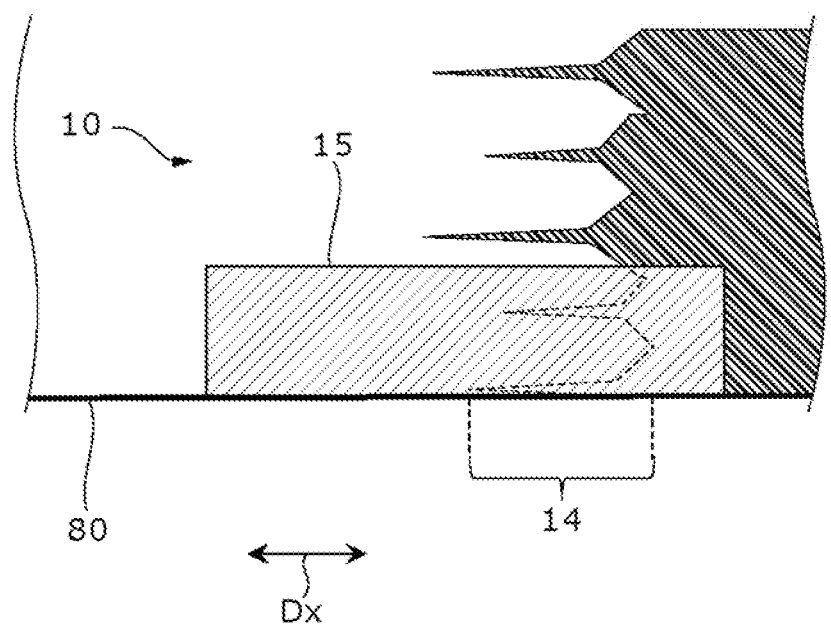
FIG. 8 is a schematic diagram illustrating a cut surface, which is viewed from an upper surface and is acquired after cutting a part of the tailing portion to which the cutting protection layer is applied after the application is performed, in the electrode sheet according to the first example embodiment of the present invention.
Figure 9:
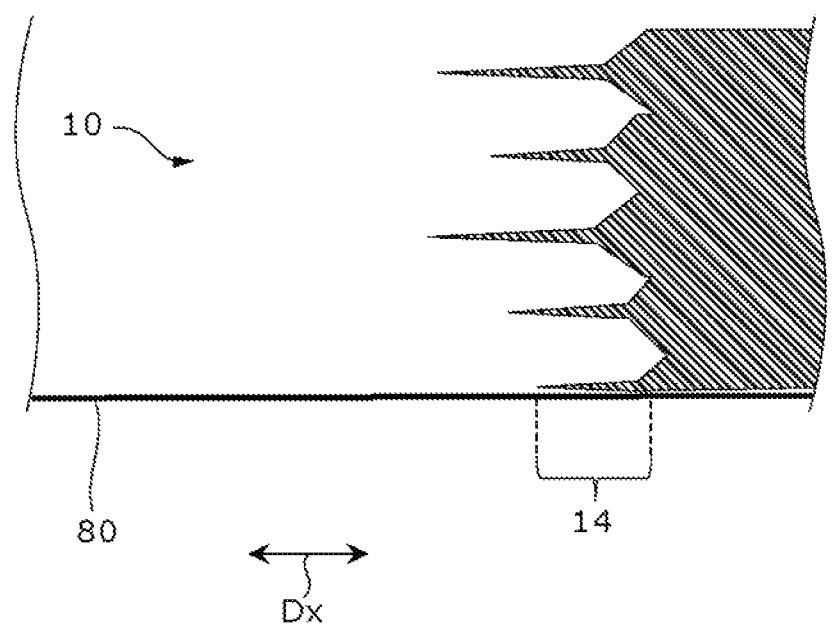
FIG. 9 is a schematic diagram illustrating the cut surface, which is viewed from the upper surface and is acquired after cutting a part of the tailing portion to which the cutting protection layer is not applied after the application is performed, in the electrode sheet according to the first example embodiment of the present invention.

FIG. 8 is a schematic diagram illustrating a cut surface 80, which is viewed from an upper surface and is acquired after cutting a part of the tailing portion 14 to which the cutting protection layer 15 is applied after the cutting protection layer 15 is applied, in the electrode sheet 10 according to the first example embodiment of the present invention. FIG. 9 is a schematic diagram illustrating the cut surface 80, which is viewed from the upper surface and is acquired after cutting a part of the tailing portion 14 to which the cutting protection layer 15 is not applied after the cutting protection layer 15 is applied, in the electrode sheet 10 according to the first example embodiment of the present invention.

The electrode sheet 10, on which the pressurizing molding is performed by the compression device 40 illustrated in FIG. 3, is drawn in one direction (toward a left direction in the drawing) while winding the electrode sheet 10 using an electrode sheet roller 90, as illustrated in FIG. 7, along the scheduled cutting line 17 in the direction in which the foil of the electrode sheet 10 flows as illustrated in FIG. 1, that is, the winding direction Dx, and is continuously cut by the slit blades 61 and 62 installed on both upper and lower surfaces of the foil.

At this time, at a spot, of which length x is equal to or larger than the threshold $x_1$, in the tailing portion 14, the active material particles bite into the foil due to the pressurizing molding as illustrated in FIG. 6, and thus a residual thickness of the metal foil 9 is thinned. However, the cutting protection layer 15 is applied to the tailing portion 14, and thus the cut surface 80 is sufficiently thick. Therefore, in the cutting step (S6 in FIG. 22), the metal foil 9 is cut in only the direction Dx in which the blade flows and the metal foil 9 is not broken in the lateral direction Dy with impact due to collision of the blade. Accordingly, as illustrated in FIG. 8, the cut surface 80 has a shape in which a burr of the active material layer is not generated.

Figure 5:
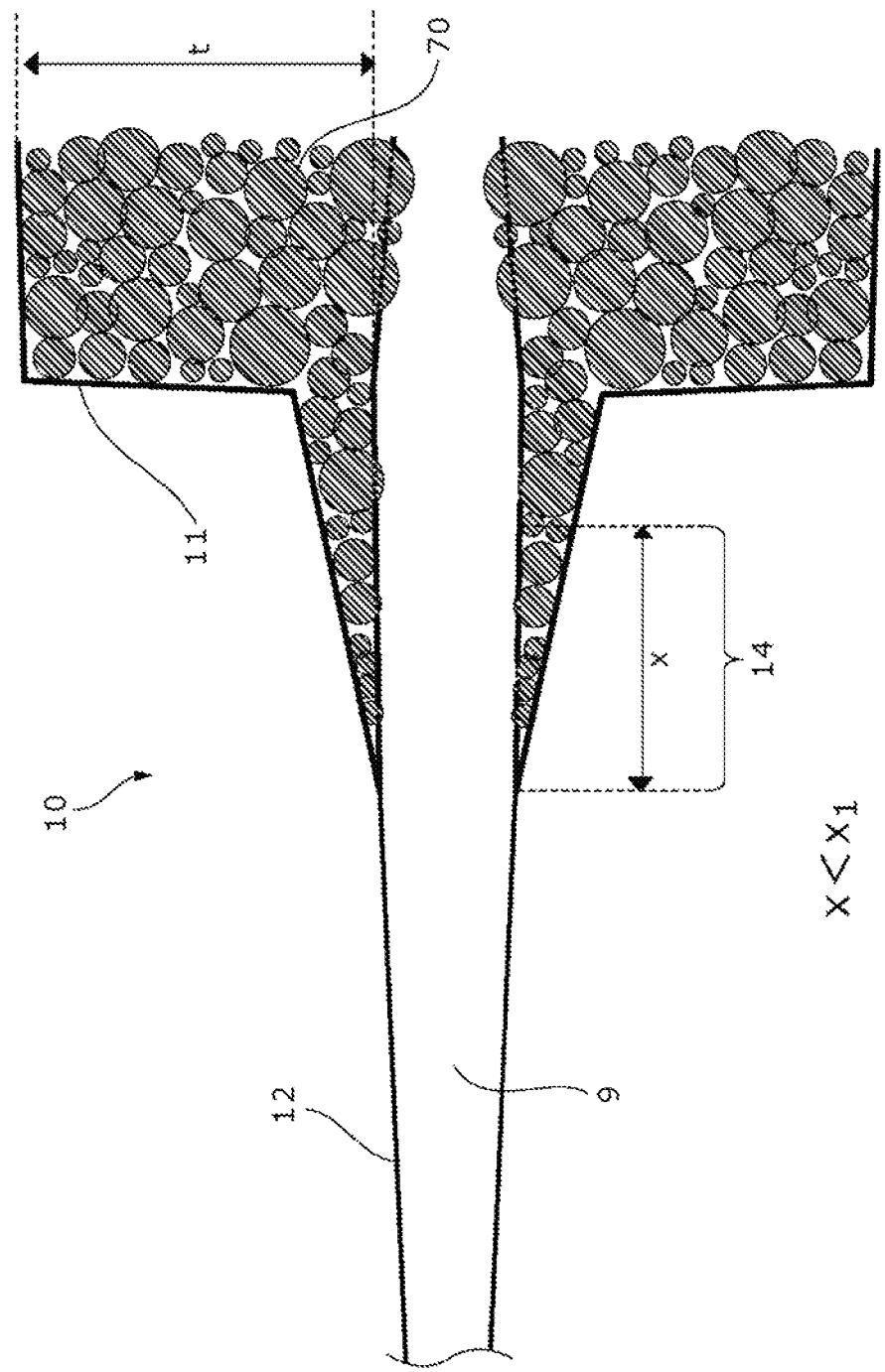
FIG. 5 is a cross-sectional diagram illustrating a part, at which a cutting protection layer is not applied to a tailing portion after application is performed, of the current collector electrode sheet after pressurizing molding is performed according to the first example embodiment of the present invention.

At a spot, of which length x is less than the threshold $x_1$, in the tailing portion 14, the active material particles hardly bite into the metal foil 9 as illustrated in FIG. 5, and thus sufficient residual thickness of the metal foil 9 is secured. Accordingly, in the cutting step (S6 in FIG. 22), the metal foil 9 is cut in only the direction Dx in which the blade flows, the metal foil 9 is not broken in the lateral direction Dy with impact due to the collision of the blade, and thus the cut surface 80 has a shape in which the burr of the active material layer is not generated, as illustrated in FIG. 9.

Note that, in the first example embodiment described above, the method of applying and drying the active material application area 11 and subsequently applying the cutting protection layer 15 is described. However, a timing, at which the cutting protection layer 15 is applied, may be any timing between steps after performing the application step of the slurry including the active material (S1 in FIG. 22) and immediately before the cutting step (S6 in FIG. 22). For example, the cutting protection layer discharger 30 may be installed in a position in which discharge is performed before the cutting step (S6 in FIG. 22) with respect to the direction in which the foil flows, that is, in the winding direction Dx in the compression device 40 or the cutting device 60 instead of the application device 20.

As described above, according to the example embodiment, in the position of which the length x is equal to or larger than the threshold $x_1$ in the tailing portion 14, the pressurizing molding is performed in the compression step, with the result that the active material particles bite into the foil, and thus the residual thickness of the metal foil 9 is thinned. However, the cutting protection layer 15 is applied to the tailing portion 14, and thus the cut surface 80 is sufficiently thick. In addition, in the position of which the length x is less than the threshold $x_1$ in the tailing portion 14, the active material particles hardly bite into the metal foil 9, and thus the sufficient residual thickness of the metal foil 9 is secured. Accordingly, in the cutting step (S6 in FIG. 22), the metal foil 9 is cut in only the direction Dx in which the blade flows, and thus the metal foil 9 is not broken in the lateral direction Dy. As above, according to the method of manufacturing the electrode sheet 10 of the example embodiment, there is an advantage in that it is possible to suppress or prevent generation of the cut burr in the cutting step (S6 in FIG. 22) regardless of the length of the tailing portion 14.

Further, according to the electrode sheet 10 of the example embodiment, there is an advantage in that it is possible to prevent a battery failure due to electrode burr in advance in a battery manufactured using an electrode produced from the electrode sheet 10.

Second Example Embodiment

Figure 10:
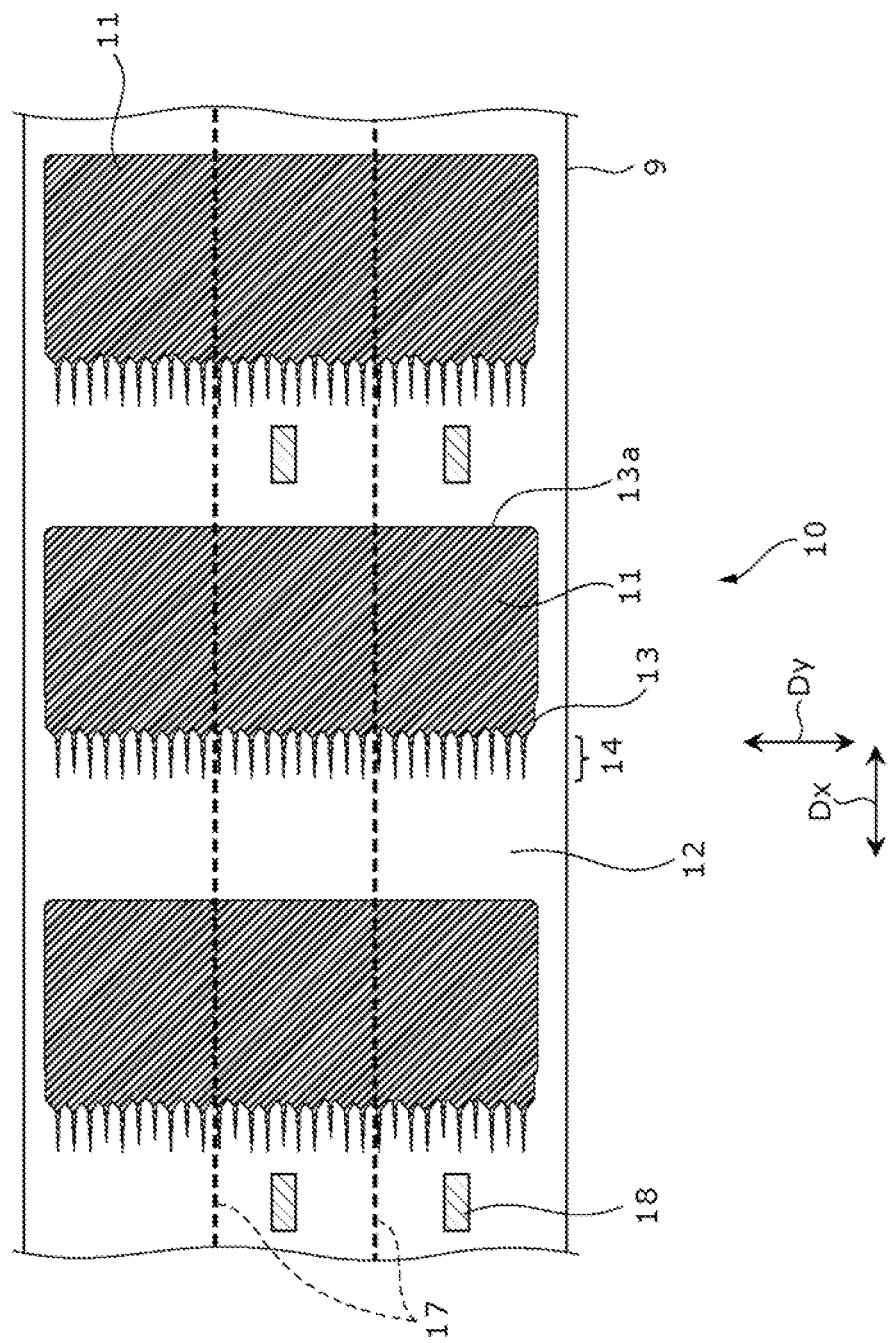
FIG. 10 is a plan view illustrating a current collector electrode sheet after application is performed on both surface according to a second example embodiment of the present invention.

FIG. 10 is a plan view illustrating a current collector electrode sheet 10 after application is performed on the both surfaces according to a second example embodiment of the present invention.

Except that a marking 18 is formed instead of the cutting protection layer 15 in a part, of which the length x is equal to or larger than $x_1$, in the direction in which the foil of the tailing portion 14 flows, that is, the winding direction Dx, the same configuration is provided as the current collector electrode sheet which is illustrated in FIG. 1 and is acquired after application is performed on the both surfaces according to the first example embodiment of the present invention.

Note that, in FIG. 10, although the marking 18 is formed over the non-application area 12 behind the terminal end 13 of the slurry application area 11 in the direction in which the foil flows, that is, the winding direction Dx, the marking 18 may be formed over the non-application area 12 ahead the coating start end 13a of the slurry application area 11 in the direction Dx in which the foil flows.

Figure 25:
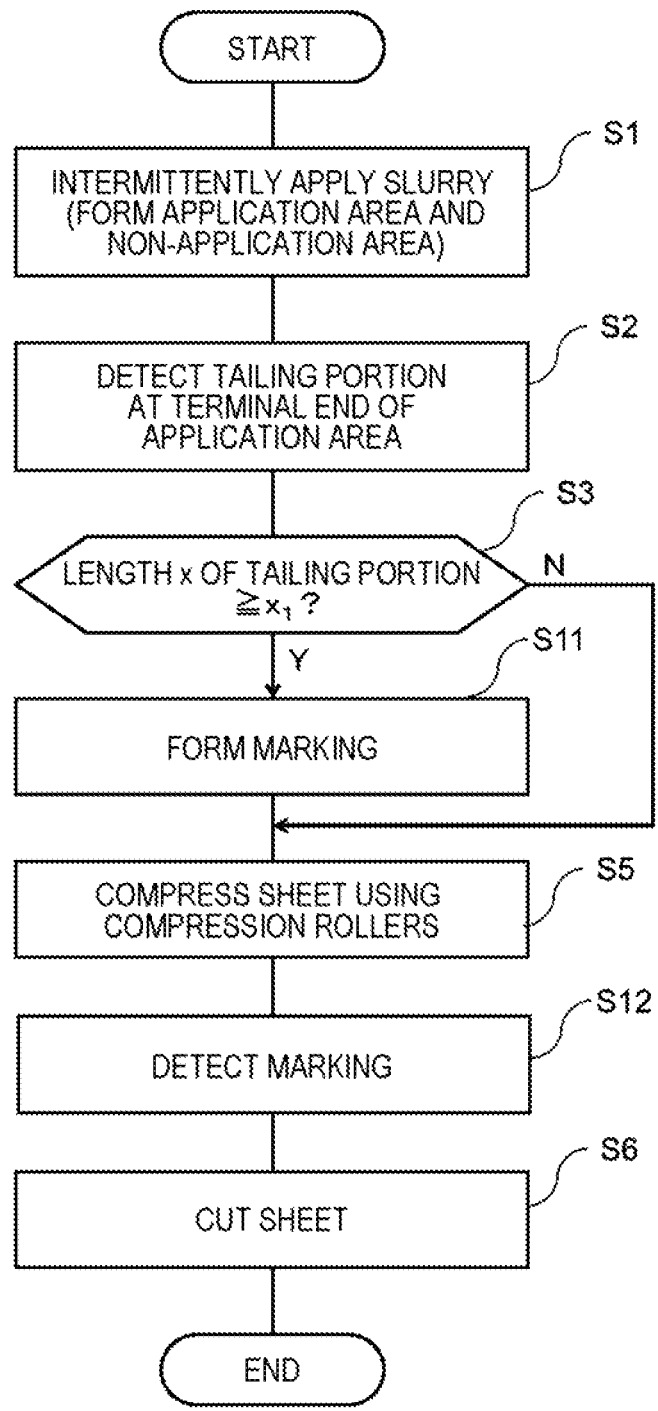
FIG. 25 is a flowchart illustrating steps of a method of manufacturing an electrode sheet 10 according to the second example embodiment of the present invention.

FIG. 25 is a flowchart illustrating steps of a method of manufacturing the electrode sheet 10 according to the second example embodiment of the present invention.

The method of manufacturing the electrode sheet 10 according to the second example embodiment of the present invention is the same as the manufacturing method of FIG. 22 except that a marking step (S11) for forming the marking 18 is included instead of the cutting protection layer forming step (S4) of the manufacturing method of FIG. 22, and a second detection step (S12) for detecting the marking 18 is further included.

Figure 11:
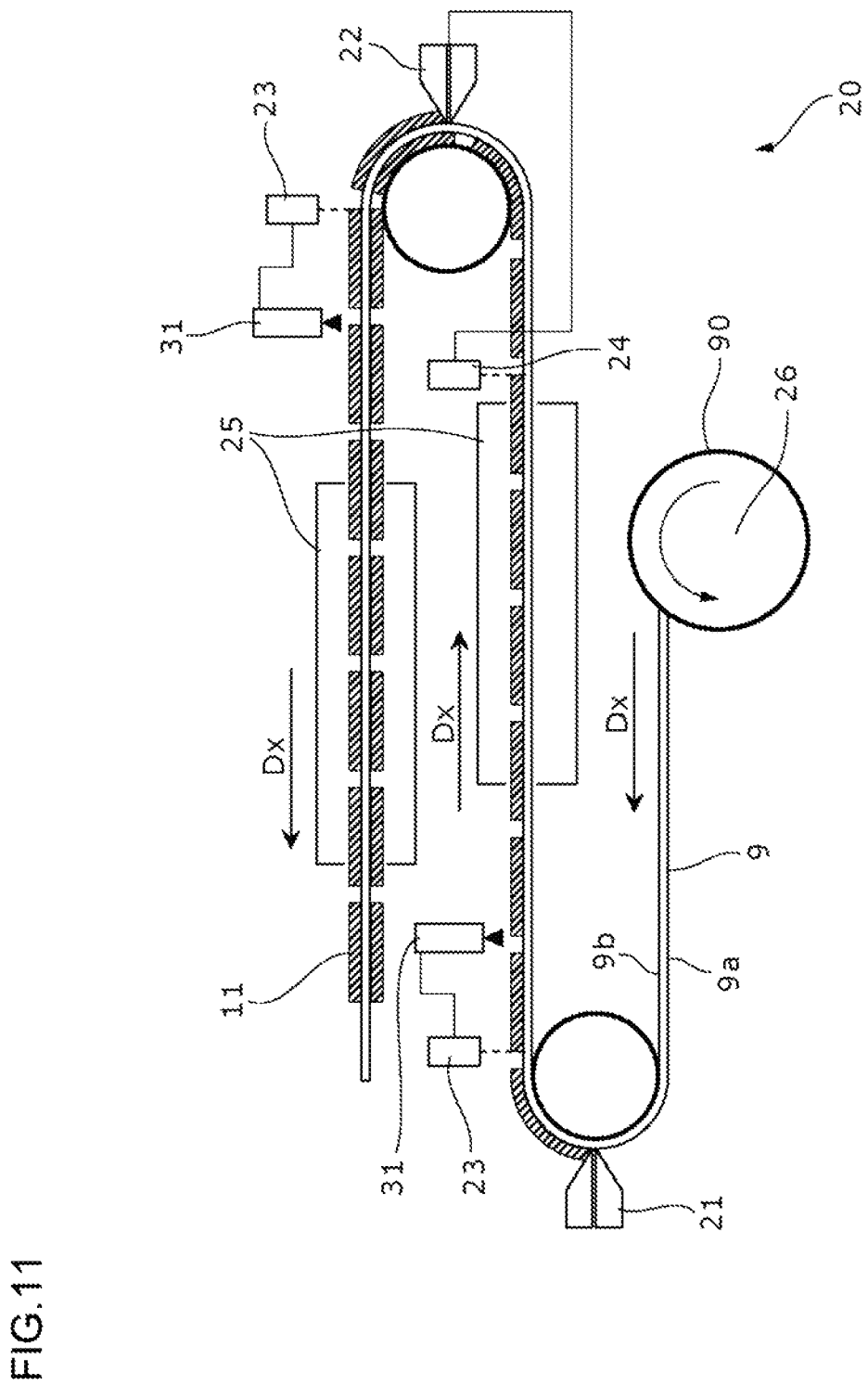
FIG. 11 is a schematic diagram illustrating an outline of a slurry application device for an electrode sheet according to the second example embodiment of the present invention.

FIG. 11 is a schematic diagram illustrating an outline of a slurry application device 20 for the electrode sheet 10 according to the second example embodiment of the present invention.

Except for a configuration in which a marking device 31 that forms the marking 18 in a portion of which the length x of the tailing portion 14 is equal to or larger than $x_1$ is provided instead of the cutting protection layer discharger 30 (FIG. 2) that is capable of applying the cutting protection layer 15 to the tailing portion 14, the same configuration is provided as the slurry application device 20 for the electrode sheet 10 according to the first example embodiment of the present invention illustrated in FIG. 2.

Here, a size of the marking 18 is sufficient as long as being detected in a second detection step (S12 in FIG. 25) of a subsequent cutting step (S6 in FIG. 25). Therefore, in a case where the marking 18 is formed with a length of approximately 10 mm and a width of approximately 2 mm, and it is possible to form the marking 18 using, for example, an inkjet method.

Subsequently, similar to the first example embodiment, the pressurizing molding is performed on the electrode sheet 10 using the compression device 40 illustrated in FIG. 3.

Figure 12:
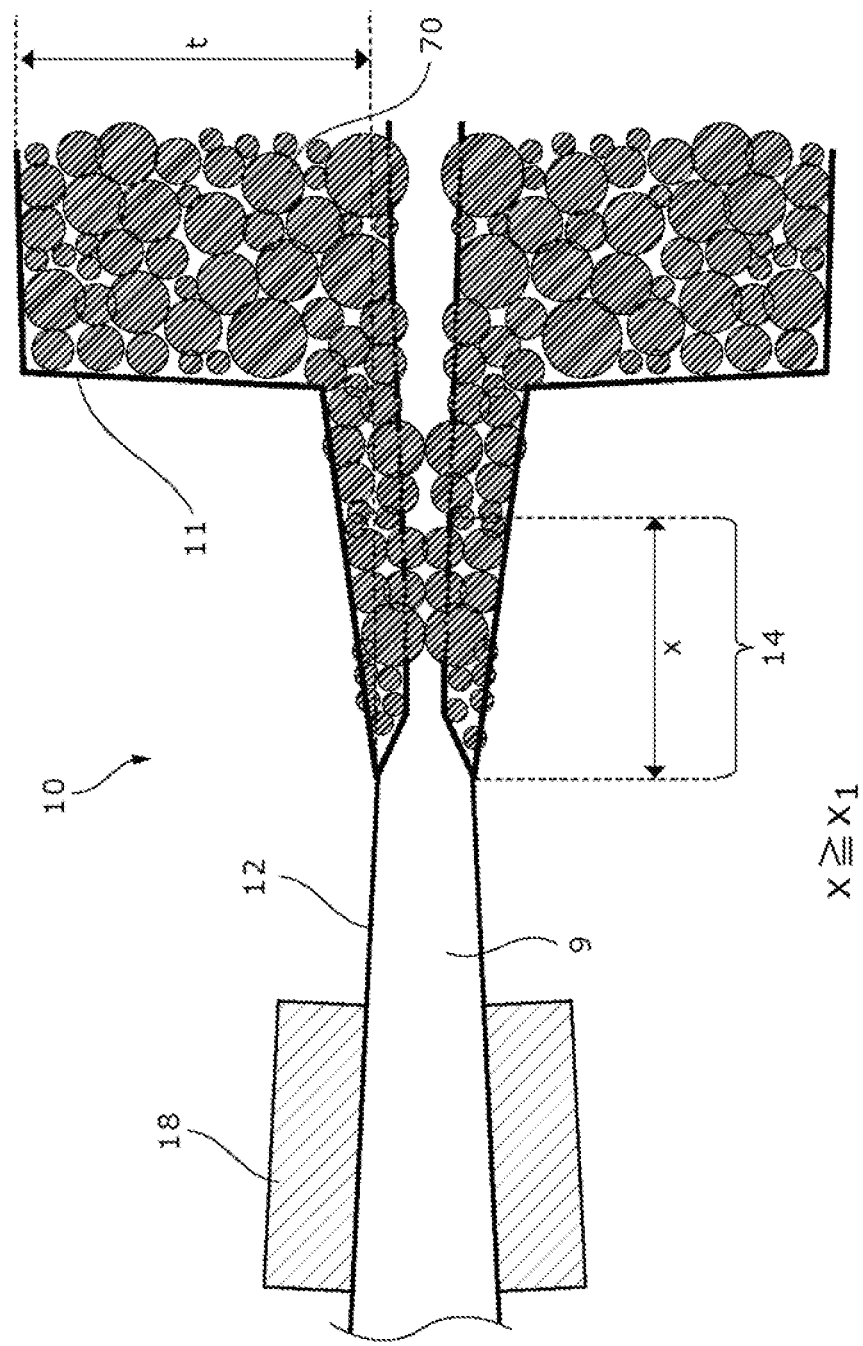
FIG. 12 is a cross-sectional diagram illustrating an intermittently coated part in which marking is given to a current collector electrode sheet acquired after pressurizing molding is performed according to the second example embodiment of the present invention.

FIG. 12 is a cross-sectional diagram illustrating a part, in which the length x of the tailing portion 14 of the application area 11 is equal to or larger than the threshold $x_1$ and the marking 18 is formed, in the current collector electrode sheet 10 after the pressurizing molding is performed according to the second example embodiment of the present invention.

Figure 13:
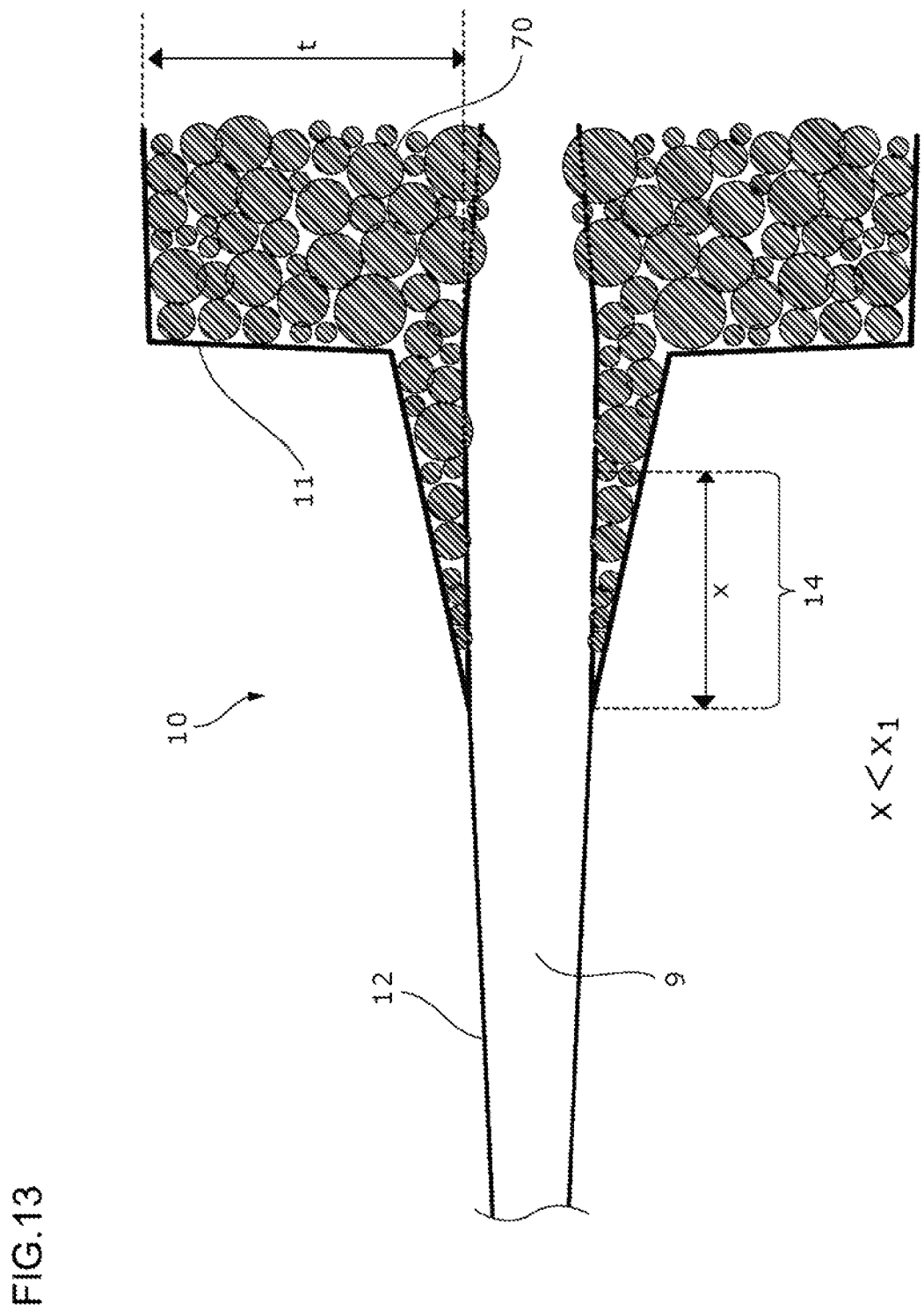
FIG. 13 is a cross-sectional diagram illustrating an intermittently coated part in which the current collector electrode sheet acquired after the pressurizing molding is not marked according to the second example embodiment of the present invention.

FIG. 13 is a cross-sectional diagram illustrating a part, in which the length x of the tailing portion 14 of the application area 11 is less than the threshold $x_1$ and the marking 18 is not formed, in the electrode sheet 10.

Similar to the first example embodiment, in the part, in which the length x of the tailing portion 14 on which the marking 18 is formed is equal to or larger than the threshold $x_1$, the compression rollers 50 come into contact with the tailing portion 14 in a case where the compression rollers 50 compress the electrode sheet 10. Therefore, a large linear pressure is locally applied, and the active material particles bite into the metal foil 9, and thus the residual amount of the metal foil 9 is extremely thinned (FIG. 6). On the other hand, at the part, in which the length x of the tailing portion 14 on which the marking 18 is not formed is less than the threshold $x_1$, the active material particles hardly bite into the metal foil 9, and a thickness of the metal foil 9 is also approximately equivalent to the thickness of the metal foil 9 of a slurry non-application area 12, the slurry being the active material, (FIG. 5).

Subsequently, as in the first example embodiment, in the cutting step (S6 in FIG. 25), the electrode sheet 10 is cut along the foil winding direction Dx by the cutting device 60 illustrated in FIG. 7.

Figure 14:
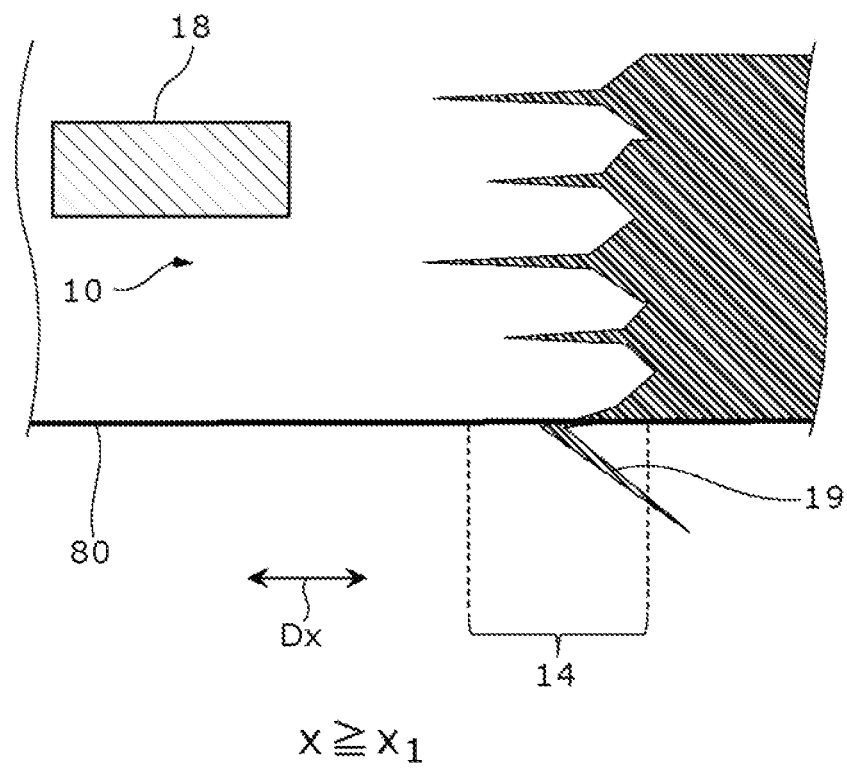
FIG. 14 is a schematic diagram illustrating a cut surface, which is viewed from an upper surface and is acquired after cutting the intermittently coated part which is marked to indicate that a length of the tailing portion after the application is performed is equal to or longer than a prescribed length, in the electrode sheet according to the second example embodiment of the present invention.
Figure 15:
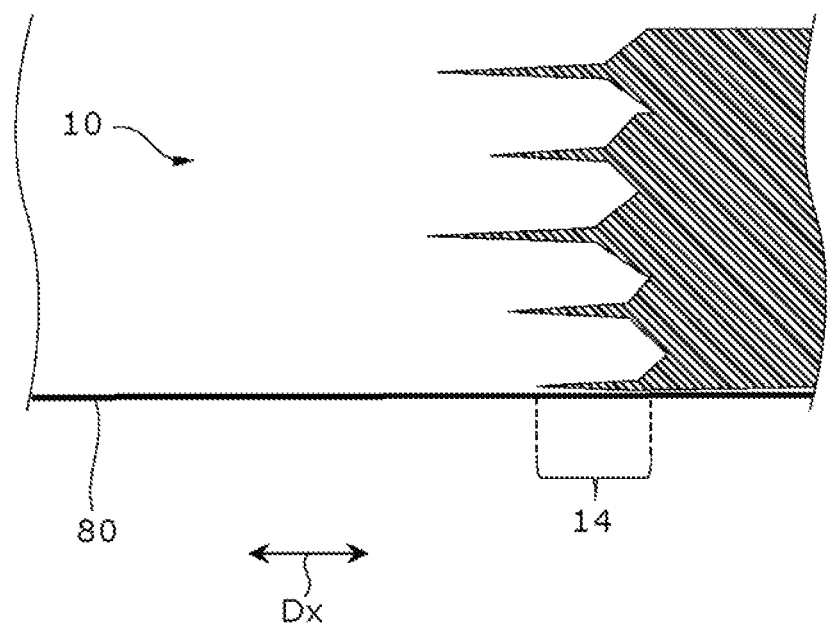
FIG. 15 is a schematic diagram illustrating the cut surface, which is viewed from the upper surface and is acquired after cutting the intermittently coated part which is not marked, in the electrode sheet according to the second example embodiment of the present invention.

FIG. 14 is a schematic diagram illustrating a cut surface, which is viewed from an upper surface and is acquired after cutting a part, in which the length x of the tailing portion 14 of the application area 11 is equal to or larger than the threshold $x_1$ and the marking 18 is formed, in the electrode sheet 10 according to the second example embodiment of the present invention. FIG. 15 is a schematic diagram illustrating a cut surface, which is viewed from the upper surface, of a part, in which the length x of the tailing portion 14 of the application area 11 is less than the threshold $x_1$ and the marking 18 is not formed, in the electrode sheet 10.

At the spot in which the marking 18 is not present and of which the length x of the tailing portion 14 is less than the threshold $x_1$, a sufficient residual thickness of the foil is secured as illustrated in FIG. 13. In the cutting step (S6 in FIG. 22), the foil is cut in only the direction Dx in which the blade flows, and the foil is not broken in the lateral direction Dy with the impact due to the collision of the blade, and thus the cut surface has the shape in which the burr of the active material layer is not generated, as illustrated in FIG. 15. In contrast, at the spot to which the marking 18 is given and of which the length of the tailing portion 14 is equal to or larger than the threshold $x_1$, the residual thickness of the foil is thinner than the slurry application area 11 or the slurry non-application area 12 (FIG. 12), and thus, in the cutting step (S6 in FIG. 22), break is generated in a direction other than the direction Dx, in which the blade flows, with the impact due to the collision of the blade, as illustrated in FIG.

14. A slurry combined layer that is fallen from the tailing portion 14 at a spot where the break is generated becomes the burr 19.

Further, the method of manufacturing the electrode sheet 10 according to the example embodiment may include a second detection step of detecting a position of the marking 18, the second detection step being performed before producing an electrochemical device using the electrode produced through the cutting step (S6 in FIG. 25), and a step of excluding a cut electrode including the marking 18 detected in the second detection step from a target member for producing the electrochemical device.

In a case where the battery is assembled using the electrode including the burr 19 generated in the above process, the burr falls off during an assembling step or after the battery is completed, and thus opposite electrodes having different potentials short-circuit, thereby increasing a failure rate of the battery. However, according to the electrode sheet 10 of the example embodiment, the marking 18 is given in advance to a spot where generation probability of the burr 19 is high, the electrode to which the marking 18 is given is excluded before assembling the battery using the electrode, and thus it is possible to prevent the electrode from flowing in subsequent steps. As described above, it is possible to manufacture an electrode piece, which has no burr and which is acquired from the electrode sheet 10 manufactured by the manufacturing method of the example embodiment, and thus there is an advantage in that it is possible to prevent battery failure due to the burr of the electrode in advance.

Note that, although not illustrated in the drawing, the detector that detects the marking 18 may be included in the cutting device 60 used in the cutting step (S6 in FIG. 25). Alternatively, after the cutting step is performed, the detector may use the electrode sheet 10, which is cut in the foil winding direction Dx, in a step of cutting in the direction Dy perpendicular to the foil winding direction Dx for each set of the slurry application area 11 and the slurry non-application area 12, intermittently coated with active materials.

Third Example Embodiment

Figure 16:
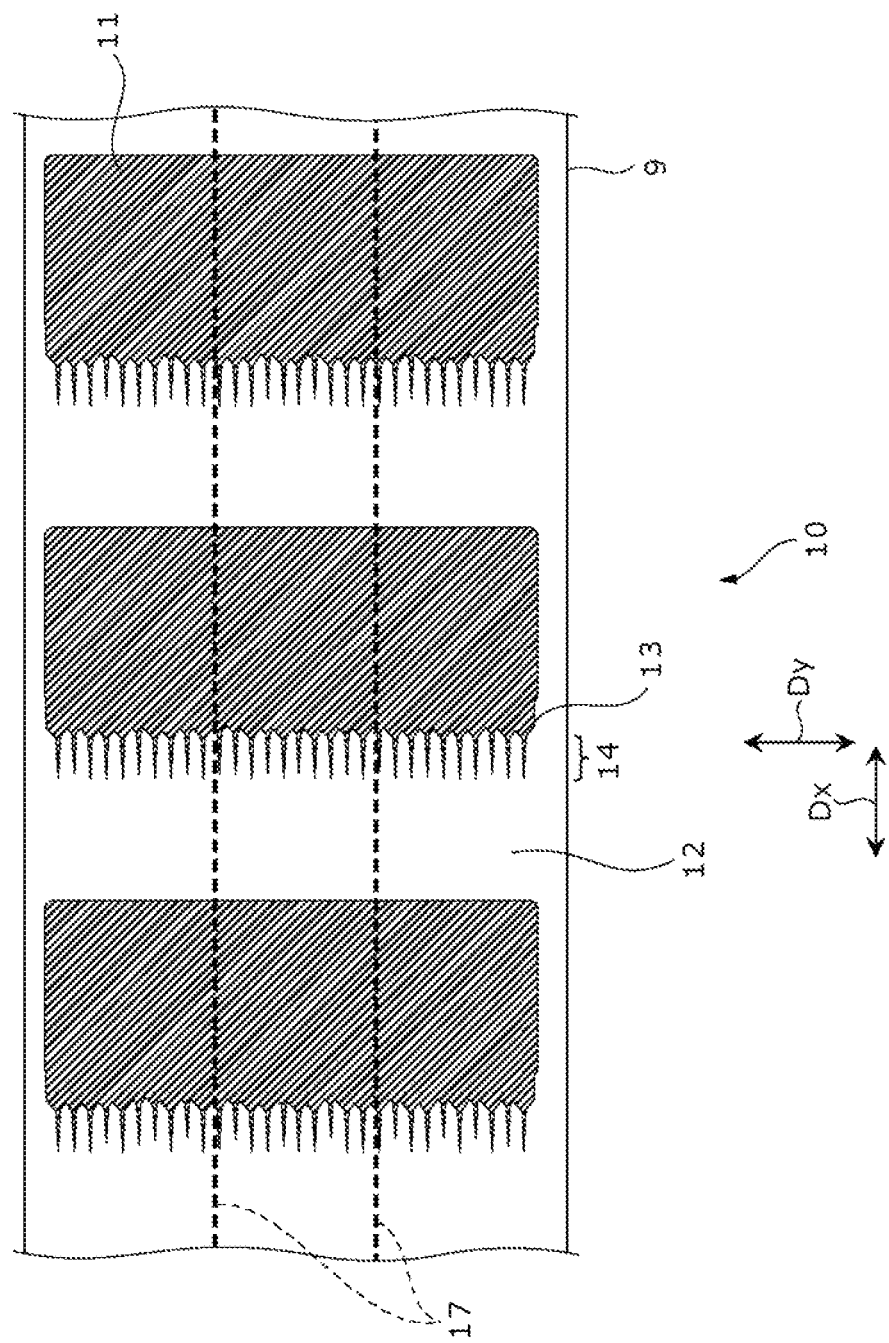
FIG. 16 is a plan view illustrating a current collector electrode sheet after application is performed on the both surfaces according to a third example embodiment of the present invention.

FIG. 16 is a plan view illustrating the current collector electrode sheet 10 after the application is performed on the both surfaces according to a third example embodiment of the present invention. Except that the cutting protection layer 15 is not formed in the part of which the length x of the tailing portion 14 in the direction in which the foil of flows, that is, the winding direction Dx is equal to or larger than the threshold $x_1$, the same configuration is provided as the current collector electrode sheet 10 acquired after the application is performed on the both surfaces according to the first example embodiment of the present invention and is illustrated in FIG. 1.

Figure 17:
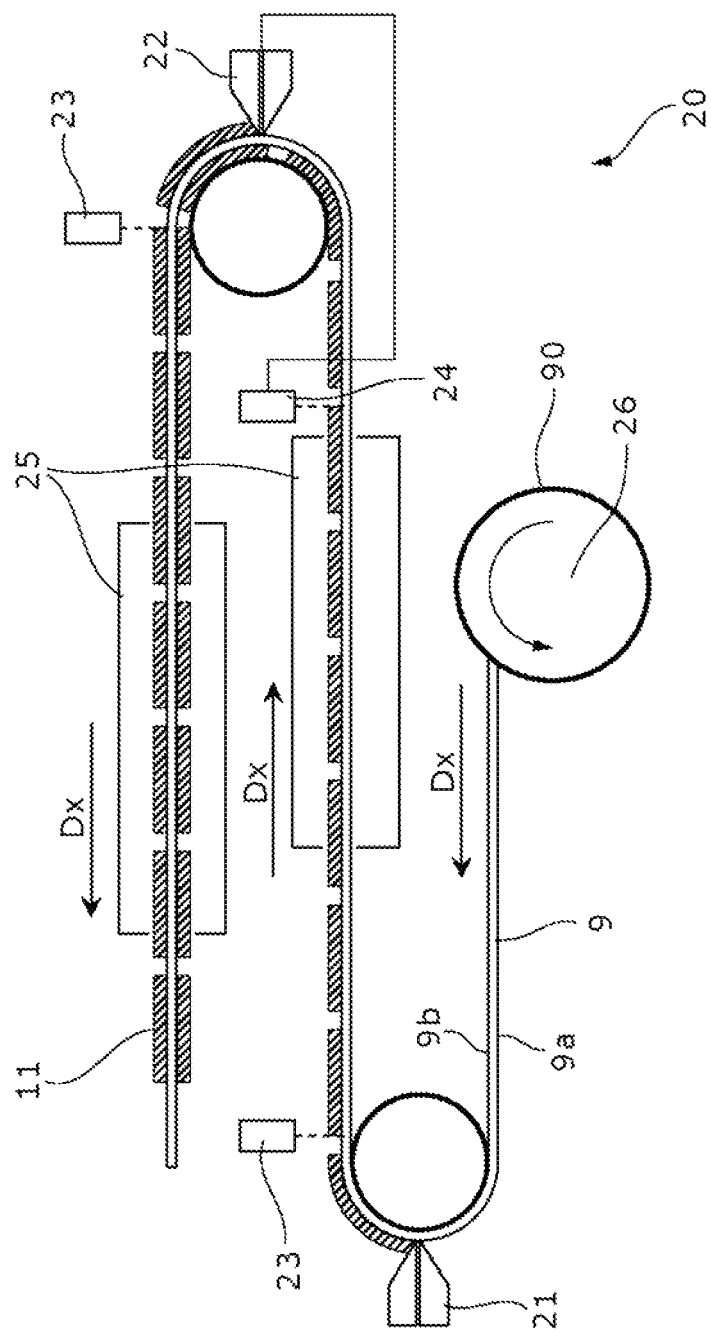
FIG. 17 is a schematic diagram illustrating an outline of a slurry application device for an electrode sheet according to the third example embodiment of the present invention.

FIG. 17 is a schematic diagram illustrating an outline of the slurry application device 20 for the electrode sheet 10 according to the third example embodiment of the present invention.

Except that the cutting protection layer discharger 30 that is capable of applying the cutting protection layer 15 to the tailing portion 14 is not present, the same configuration is provided as the slurry application device 20 for the electrode sheet illustrated in FIG. 2 according to the first example embodiment of the present invention.

The first arithmetic unit 28 (FIG. 23) of the terminal end detector 23 calculates the length x of the tailing portion 14 of each application area 11 of the electrode sheet 10 in the direction in which the foil flows, that is, the winding direction Dx, and transmits a signal to the second arithmetic unit 29 (FIG. 23) of the terminal end detector 23. After the lengths x's of the tailing portions 14 of the all slurry application areas 11 are transmitted, the second arithmetic unit 29 aggregates results and outputs a maximum value $x_{max}$ of the length x.

Further, the second arithmetic unit 29 or another arithmetic device outputs, as a selection value of a roll diameter r of the compression roller 50 used in the compression step (S5 in FIG. 22) which is the subsequent step, the roll diameter r satisfying the following Equation (3).

$$r \geq t_{min}/2 + (x_{max} + y_{max} + z_{max}X + w_{max})^2/(2t_{min}) \quad \text{Equation (3)}$$

Here, the other arithmetic device is a computer that performs arithmetic processing by receiving an input of the maximum value $x_{max}$ of the length of the tailing portion 14, which is output by the second arithmetic unit 29 of the terminal end detector 23, or receiving the maximum value $x_{max}$.

In Equation (3), $t_{min}$, $y_{max}$, $z_{max}$, and $w_{max}$ are the same as in Equation (2), and each value is input to the terminal end detector 23 or the other arithmetic device. Although an input means for each value is not particularly limited, for example, the input value may be received in such a way that an operator operates an operation unit (a keyboard, a keypad, operation buttons, or a touch panel) of a computer that realizes the terminal end detector 23 or the other arithmetic device, or a value transmitted from the computer through a communication path or a communication network may be received.

An output means for outputting each value of the calculated maximum value $x_{max}$ or the roll diameter r is not particularly limited as long as it is possible to provide a notification to the operator. For example, the output means may record each value in a memory of a computer that realizes the terminal end detector 23, or may display each value on a display (not illustrated in the drawing) of the terminal end detector 23. In addition, each value recorded in the memory may be further recorded on another recording medium or may be transmitted through a communication path or a communication network corresponding to the storage device or the arithmetic device.

Subsequently, in the compression step (S5 in FIG. 25), pressurizing compression is performed on the electrode sheet 10 by the compression device 40 illustrated in FIG. 3. Except that the value of the roll diameter r of the compression roller 50 is set to a value output using the above-described method, the same configuration is provided as the electrode sheet compression device 40 according to the first example embodiment of the present invention.

Figure 18:
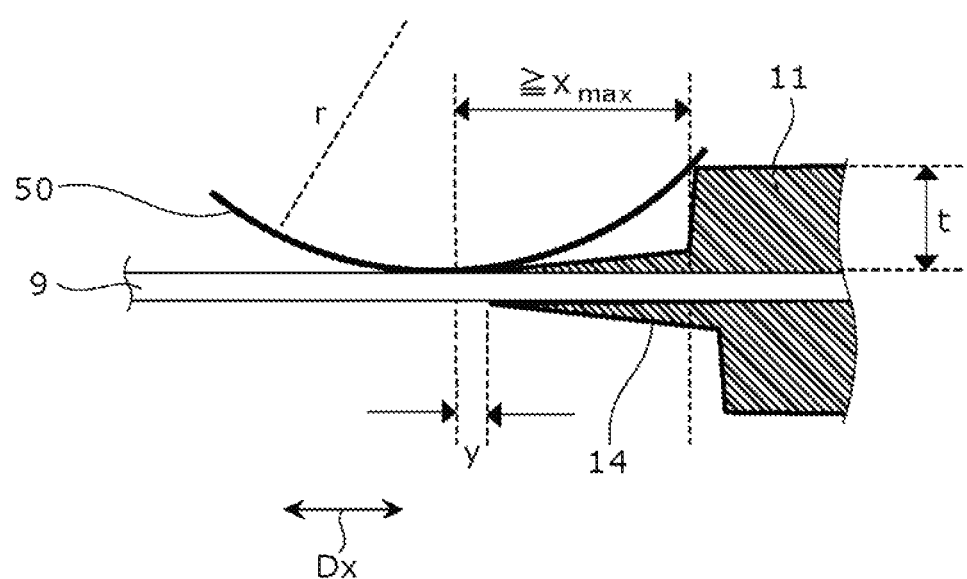
FIG. 18 is a cross-sectional diagram illustrating a relationship between the current collector electrode sheet after application on the both surfaces and a compression roller according to the third example embodiment of the present invention.

FIG. 18 is a cross-sectional diagram illustrating a relationship between the current collector electrode sheet 10 and the compression roller 50 after application is performed on the both surfaces according to the third example embodiment of the present invention.

In a case where the roll diameter r of the compression roller 50 is appropriately selected and the compression roller 50 compresses the active material application area 11, the compression roller 50 does not come into contact with the electrode sheet 10 in a direction in which the foil flows from an electrode part of the application terminal end 13, that is, the winding direction Dx, or a length of an area, with which the compression roller 50 very slightly comes into contact, is equal to or larger than $x_{max}$.

Figure 19:
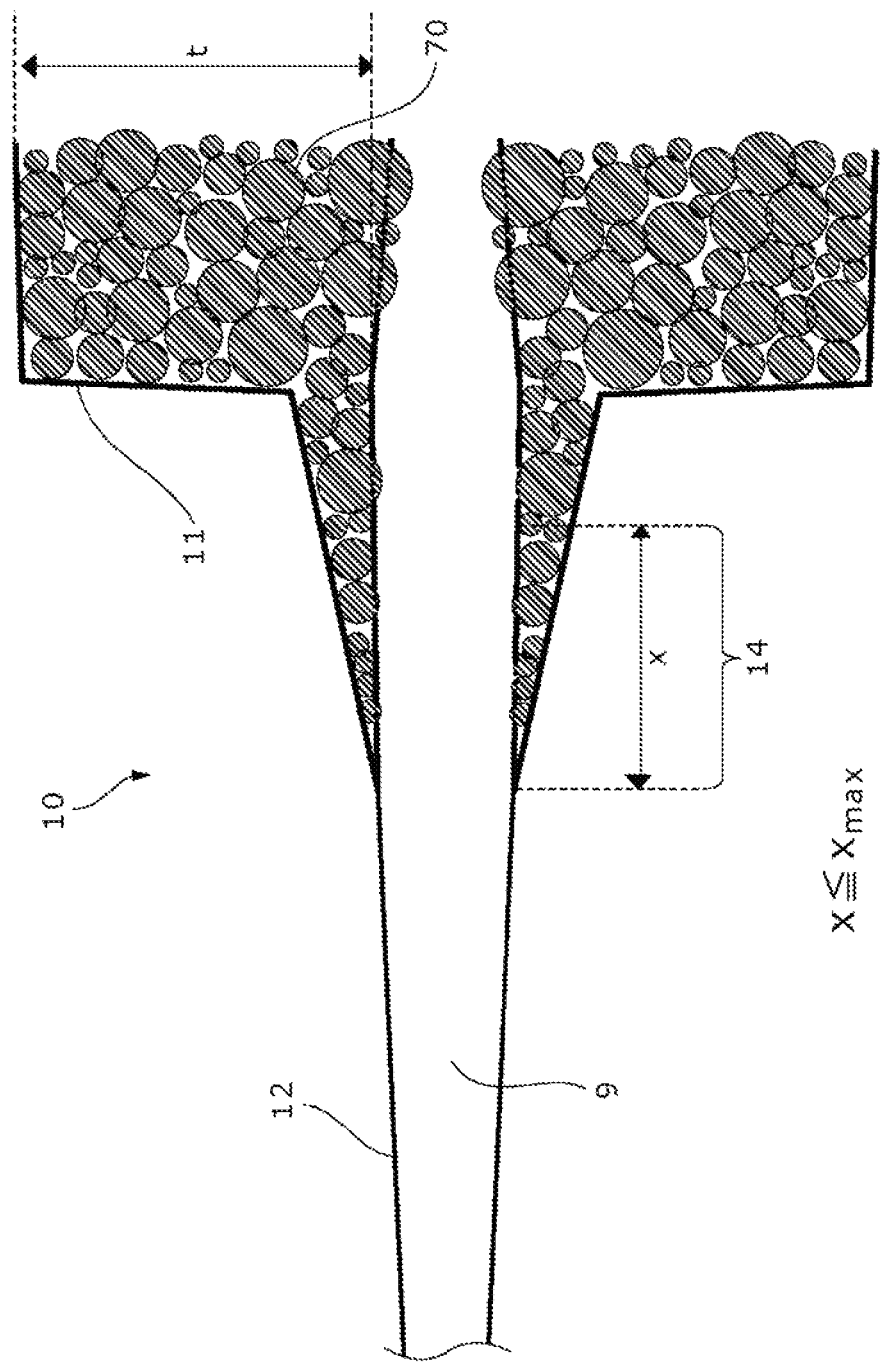
FIG. 19 is a cross-sectional diagram illustrating a current collector electrode sheet after pressurizing molding is performed according to the third example embodiment of the present invention.

Therefore, the linear pressure is not applied to the tailing portion 14, and the active material particles hardly bite into the metal foil 9. Although FIG. 19 is a cross-sectional diagram illustrating the current collector electrode sheet 10 after pressurizing molding is performed according to the third example embodiment of the present invention, the thickness of the metal foil 9 at a part of the tailing portion 14 is substantially equivalent to the thickness of the metal foil 9 of the slurry non-application area 12, the slurry being the active material or the like.

As described above, the electrode sheet 10 manufactured in the example embodiment includes an area that is not compressed by the compression rollers 50 in the tailing portion 14 at the terminal end 13 of each application area 11.

Subsequently, similar to the first example embodiment, in the cutting step (S6 in FIG. 22), the electrode sheet 10 is cut along the foil winding direction Dx by the cutting device 60 illustrated in FIG. 7.

Figure 20:
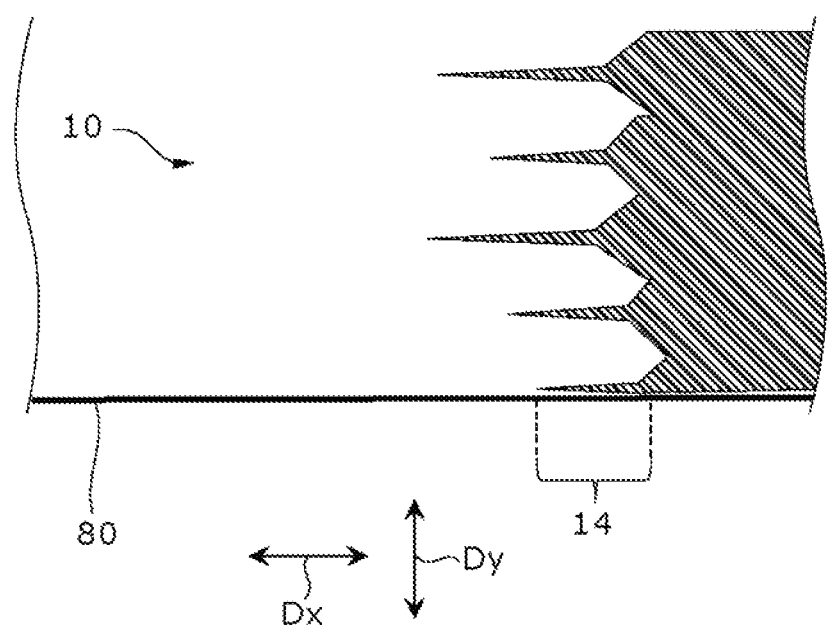
FIG. 20 is a schematic diagram illustrating a cut surface which is viewed from an upper surface and is acquired after cutting the electrode sheet according to the third example embodiment of the present invention.

FIG. 20 is a schematic diagram of the cut surface 80 viewed from the upper surface after cutting the electrode sheet 10 according to the third example embodiment of the present invention.

According to the example embodiment, it is possible to select the compression roller 50 having an appropriate roll diameter using the roll diameter r of the compression roller 50 calculated through Equation (3). Further, in the electrode sheet 10 after the compression step (S5 in FIG. 22) is performed, a sufficient residual thickness of the metal foil 9 is secured as illustrated in FIG. 19 regardless of the length of the tailing portion 14, and, in the cutting step (S6 in FIG. 22), the foil is cut in only the direction Dx in which the blade flows. Therefore, the foil is not broken in the lateral direction Dy, and thus the cut surface 80 has a shape in which the burr of the active material layer is not generated as illustrated in FIG. 20.

Fourth Example Embodiment

Figure 27:
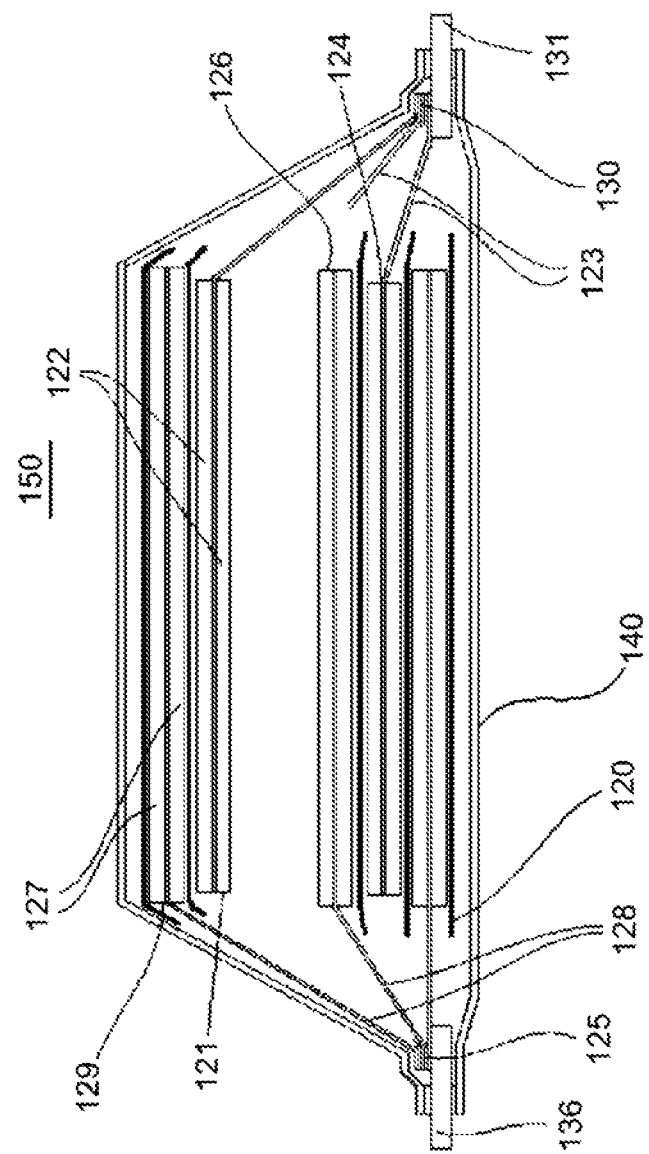
FIG. 27 is a schematic diagram illustrating an example of a configuration of a battery according to the example embodiment of the present invention.
Figure 28:
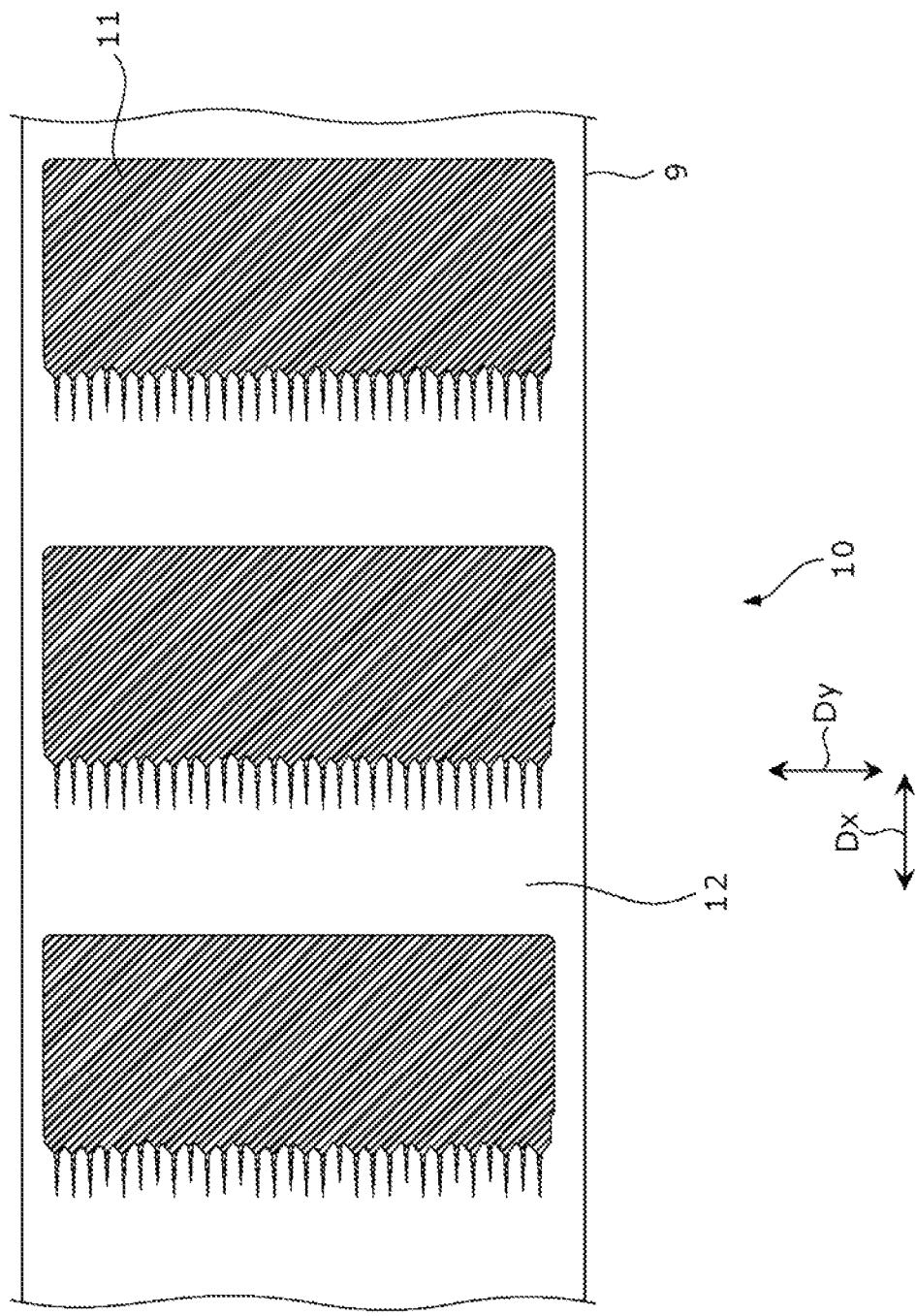
FIG. 28 is a plan view illustrating an electrode sheet produced by applying an active material through an intermittent coating method.

FIG. 27 is a schematic diagram illustrating an example of a configuration of a battery 150 according to an example embodiment of the present invention.

The battery according to the example embodiment includes an electrode produced from the electrode sheet 10 described in the above example embodiment. Hereinafter, the battery according to the example embodiment will be described with reference to a case where the battery is a stacked battery 150 of a lithium ion battery as a representative example.

The stacked battery 150 includes battery elements in which a positive electrode 121 and a negative electrode 126 are alternately stacked in a plurality of layers with separators 120 interposed therebetween, and the battery elements are accommodated in a container, which is formed of a flexible film 140, together with an electrolytic solution (not illustrated in the drawing). A configuration is provided in which a positive electrode terminal 131 and a negative terminal 136 are electrically connected to the battery elements, and a part or the whole of the positive electrode terminal 131 and the negative terminal 136 are drawn out to an outside of the flexible film 140.

The positive electrode 121 is provided with a positive electrode active material application portion (the positive electrode active material layer 122) and a non-application portion, respectively, on the front and back of a positive electrode current collector layer 123. The negative electrode 126 is provided with a negative electrode active material application portion (negative electrode active material layer 127) and a non-application, respectively, on the front and back of the negative electrode current collector layer 128.

A non-positive electrode active material application portion in the positive electrode current collector layer 123 is set as a positive electrode tab 130 for connecting to the positive electrode terminal 131, and a non-negative electrode active material application portion in the negative electrode current collector layer 128 is set as a negative electrode tab 125 for connecting to the negative electrode terminal 136.

The positive electrode tabs 130 are integrated over the positive electrode terminal 131 and are connected to each other, together with the positive electrode terminal 131, through ultrasonic welding, and the negative electrode tabs 125 are integrated over the negative electrode terminal 136 and are connected to each other, together with the negative electrode terminal 136, through the ultrasonic welding. In addition, one end of the positive electrode terminal 131 is drawn out to an outside of the flexible film 140, and one end of the negative electrode terminal 136 is also drawn out to an outside of the flexible film 140.

It is possible to form an insulating member at a boundary portion 124 between the positive electrode active material application portion (application area 11) (the positive electrode active material layer 122) and the non-application portion (non-application area 12), if necessary, and it is possible to form the insulating member in a vicinity of a boundary portion between both the positive electrode tab 130 and the positive electrode active material, in addition to the boundary portion 124.

Similarly, it is possible to form the insulating member at a boundary portion 129 between the negative electrode active material application portion (negative electrode active material layer 127) and the non-application portion, if necessary, and it is possible to form the insulating member in a vicinity of a boundary portion between both the negative electrode tab 125 and the negative electrode active material.

Normally, an outer dimension of the negative electrode active material layer 127 is larger than an outer dimension of the positive electrode active material layer 122, and is smaller than an outer dimension of the separator 120.

(Non-Aqueous Electrolyte Containing Lithium Salt)

It is possible to appropriately select a non-aqueous electrolyte containing lithium salt used in the example embodiment from known ones according to a type of the electrode active material and a purpose of the lithium ion battery.

As specific examples of the lithium salt, for example, $LiClO_4$, $LiBF_6$, $LiPF_6$, $LiCF_3SO_3$, $LiCF_3CO_2$, $LiA_5F_6$, $LiSbF_6$, $LiB_{10}Cl_{10}$, $LiAlCl_4$, LiCl, LiBr, LiB $(C_2H_5)_4$, $CF_3SO_3Li$, $CH_3SO_3Li$, $LiC_4F_9SO_3$, Li $(CF_3SO_2)_2N$, and lower fatty acid carboxylic acid lithium may be given.

As a solvent for dissolving the lithium salt is not particularly limited as long as the solvent is generally used as a liquid for dissolving the electrolyte, and carbonates such as ethylene carbonate (EC), propylene carbonate (PC), butylene carbonate (BC), dimethyl carbonate (DMC), ethyl methyl carbonate (EMC), diethyl carbonate (DEC), methyl ethyl carbonate (MEC), and vinylene carbonate (VC); lactones such as γ-butyrolactone and γ-valerolactone; ethers such as trimethoxymethane, 1,2-dimethoxyethane, diethyl ether, tetrahydrofuran, and 2-methyltetrahydrofuran; sulfoxides such as dimethyl sulfoxide; oxolanes such as 1,3-dioxolane, and 4-methyl-1,3-dioxolane; nitrogen-containing solvents such as acetonitrile, nitromethane, formamide, and dimethylformamide; organic acid esters such as methyl formate, methyl acetate, ethyl acetate, butyl acetate, methyl propionate, and ethyl propionate; trialkyl phosphate and diglymes; triglymes; sulfolanes such as sulfolane and methylsulfolane; oxazolidinones such as 3-methyl-2-oxazolidinone; sultones such as 1,3-propanesultone, 1,4-butanesultone, and naphthasultone are given. One type of solvent may be used alone or two or more types of solvents may be combined and used.

(Container)

In the example embodiment, it is possible to use a known member as the container, and it is preferable to use the flexible film 140 from a viewpoint of light weight battery. It is possible to use the flexible film 140 in which a resin layer is provided on front and back surfaces of a metal layer that becomes a base material. As the metal layer, it is possible to select a metal layer having a barrier property such as prevention of leakage of the electrolytic solution or intrusion of moisture from the outside, and it is possible to use aluminum or stainless steel. A thermal fusion bonding resin layer, such as a modified polyolefin, is provided on at least one surface of the metal layer, and an exterior body is formed by causing the thermal fusion bonding resin layers of the flexible film 140 to face each other through the battery elements, and by performing thermal fusion bonding on a periphery of a part which stores the battery elements. It is possible to provide a resin layer, such as a nylon film or a polyester film, on a surface of the exterior body which becomes a surface of an opposite side to the surface on which the thermal fusion bonding resin layer is formed.

(Terminal)

In the example embodiment, it is possible to use the positive electrode terminal 131 which is formed of aluminum or an aluminum alloy, and the negative electrode terminal 136 which is formed of copper, a copper alloy, nickel-plated copper, or a nickel-plated copper alloy. Although each of the terminals is drawn out to an outside of the container, it is possible to provide a thermal fusion bonding resin in advance at a spot which is positioned at a part in which a periphery of an exterior body is thermally welded.

(Insulating Member)

In the case where the insulating member is formed at the boundary portions 124 and 129 between the active material application portion and the non-application portion, it is possible to use polyimide, glass fiber, polyester, polypropylene, or a material containing any of the polyimide, the glass fiber, the polyester, and the polypropylene. It is possible to form the insulating member by applying heat to the members and welding the members to the boundary portions 124 and 129, or by applying a gel-like resin to the boundary portions 124 and 129 and drying the gel-like resin.

(Separator)

It is preferable that the separator 120 according to the example embodiment includes a resin layer containing a heat-resistant resin as a main component.

Here, the resin layer is formed of the heat-resistant resin as the main component. Here, the "main component" indicates that a proportion in the resin layer is equal to or larger than 50% by mass, preferably is equal to or larger than 70% by mass, more preferably is equal to or larger than 90% by mass, and may be 100% by mass.

The resin layer which forms the separator 120 according to the example embodiment may be a single layer or two or more layers.

As the heat-resistant resin for forming the resin layer, it is possible to give one type or two or more types selected from among, for example, polyethylene terephthalate, polybutylene terephthalate, polyethylene naphthalate, poly-m-phenylene terephthalate, poly-p-phenylene isophthalate, polycarbonate, polyester carbonate, aliphatic polyamide, wholly aromatic polyamide, semi-aromatic polyamide, fully aromatic polyester, polyphenylene sulfide, polyparaphenylene benzobisoxazole, polyimide, polyarylate, polyetherimide, polyamideimide, polyacetal, polyetheretherketone, polysulfone, polyethersulfone, a fluorine-based resin, polyether nitrile, modified polyphenylene ether.

Here, from a viewpoint of excellent balance of heat resistance, mechanical strength, elasticity, and price, one type or two or more types are preferable which are selected from among the polyethylene terephthalate, the polybutylene terephthalate, the polyethylene naphthalate, the aliphatic polyamide, the wholly aromatic polyamide, the semi-aromatic polyamide, and the wholly aromatic polyester, one type or two or more types are more preferable which are selected from among the polyethylene terephthalate, polybutylene terephthalate, aliphatic polyamide, wholly aromatic polyamide and semi-aromatic polyamide, one type or two or more types are further preferable which are selected from the polyethylene terephthalate and wholly aromatic polyamides, and polyethylene terephthalate is more preferable.

It is preferable that the resin layer for forming the separator 120 according to the example embodiment is a porous resin layer. Herewith, in a case where an abnormal current occurs in the lithium ion battery and a temperature of the battery rises, it is possible to block flow of currents by closing the micropores in the porous resin layer, and thus it is possible to avoid thermal runaway of the battery.

From the viewpoint of balance between the mechanical strength and the lithium ion conductivity, it is preferable that porosity of the porous resin layer is equal to or higher than 20% and is equal to or less than 80%, it is more preferable that the porosity of the porous resin layer is equal to or higher than 30% and is equal to or less than 70%, and it is particularly preferably that the porosity of the porous resin layer is equal to or higher than 40% and is equal to or less than 60%.

It is possible to acquire the porosity from the following Equation (4).

$$\varepsilon = \{1 - Ws/(ds \cdot t)\} \times 100\} \qquad \text{Equation (4)}$$

Here, $\varepsilon$: porosity (%), Ws: weight per area (g/m$^2$), ds: true density (g/cm3), t: film thickness (μm).

The planar shape of the separator 120 according to the example embodiment is not particularly limited, may be appropriately selected in accordance with the shape of the electrode or the current collector, and may be, for example, a rectangle.

The thickness of the separator 120 according to the example embodiment is preferably equal to or larger than 5 μm and is equal to or less than 50 μm from the viewpoint of the balance between the mechanical strength and the lithium ion conductivity.

As described above, according to the example embodiment, it is possible to manufacture a battery using the electrode sheet 10 produced by the manufacturing method of the above example embodiment.

According to the method of manufacturing the electrode of the present invention, it is possible to suppress the generation of the burr on a thin current collector, such as the metal foil, in a case of producing the electrode through the compressing and cutting steps (S5 and S6 in FIG. 22) after forming and drying the active material layer over the current collector, it is possible to assemble an electrochemical device, such as a battery, in which the use of the electrode sheet on which the burr is generated is prevented beforehand, and it is possible to provide the electrochemical device such as battery having excellent properties.

Hereinabove, although example embodiments of the present invention are described with reference to the drawings, the example embodiments are examples of the present invention, and it is possible to use various configurations other than the above example embodiments.

In addition, the present invention is not limited to the above-described example embodiments, and modifications and improvements are included in the present invention in a scope that it is possible to achieve the object of the present invention.

Hereinafter, specific examples will be described in further detail.

Example 1

Li (Ni0.6Co0.2Mn0.2)O$_2$, in which a 50% cumulative diameter (D50) acquired from a particle size distribution measurement value was 8 μm and, similarly, a 90% cumulative diameter (D90) was 12 μm, as the positive electrode active material, of 94.8% by mass, a graphite material as a conductive auxiliary agent of 2.5% by mass, polyvinylidene fluoride as a binder of 2.7% by mass were mixed, and N-methylpyrrolidone was added and was further mixed therewith, thereby producing a positive electrode slurry.

By discharging the slurry from a die head, the slurry was intermittently applied over a surface of a current collector foil of the aluminum foil having a strip shape, which moved over the backup roller and had a thickness of 12 μm, so that the application areas 11 and the non-application areas 12 were alternately formed in the foil winding direction Dx of the foil. Subsequently, a shape of the terminal end 13 of each application area 11 was detected by using a laser type detector that was installed immediately next to the die head along in direction in which the foil flowed, the tailing portion 14 which was equal to or larger than 2.6 mm in a scheduled cutting area was detected from tailing portions 14, the tailing portion 14 detected in the first detection step (S2 in FIG. 22) was applied with an ultraviolet curing resin having a width of 3 mm and a length of 8 mm to cover the tailing portion 14 using a resin discharger that was installed next, and the resin layer applied using an ultraviolet irradiator was solidified, thereby forming the cutting protection layer 15.

Further, the slurry containing the active material applied to the aluminum foil was dried and solidified by a drying furnace installed next. Further, with respect to the back surface on which the slurry was applied in the application step (S1 in FIG. 22), slurry application, detection of the tailing portion, application of the ultraviolet resin, curing, and drying and solidification of the slurry were performed in the same manner while detecting a start end of the application area applied to the front surface and performing control such that a deviation in the start end of the application area on the back surface became equal to or less than 1 mm, thereby acquiring an electrode sheet having the both surfaces of the aluminum foil applied with the slurry. Note that, in the slurry application step (S1 in FIG. 22), parameters, such as slurry discharge pressure and the speed of the backup roller, were adjusted such that a deviation in a length of the application area 11 in the same aluminum foil roll was equal to or less than 2 mm or and a distance to a portion where the thickness of the coating film became the same as the center of the coating area became 1.8 mm. In addition, the amount of discharge was adjusted such that the thickness of the cutting protection layer 15 after curing the ultraviolet curing resin was about 3 μm.

Subsequently, using a pressurizing compression device provided with a pair of two compression rollers, upper and lower compression rollers, each having a roll radius of 250 mm, pressurizing compression was performed by installing the electrode sheet 10, to which the slurry was intermittently applied in the above-mentioned step, such that the electrode sheet passed between the compression rollers and winding tension became 230 N, and causing the electrode sheet 10 to move over the backup roller at a rotation speed of 60 m/min. At this time, the compression pressure was adjusted such that the linear pressure over the coating area of the active material slurry became 1.8 t/cm, the gap between the upper and lower compression rollers was 0.4 mm on average, and the roller compression pressure became 19 MPa on average. A part of the acquired electrode sheet was extracted, and the minimum thickness of the one-side active material layer became 62.6 μm.

Subsequently, using the cutting device having a shear blade at an upper part and a gang blade at a lower part, the electrode sheet 10, on which the pressurizing compression was performed, was caused to pass between the blades, was installed such that the winding tension became constant, and was caused to move over the backup roller at a constant speed, thereby performing cutting. A part of the acquired cut sheet was extracted, and presence or absence of the burr from the tailing portion 14 after the cutting step (S6 in FIG. 22) was performed was checked.

Comparative Example 1

In Example 1, the electrode sheet 10 was produced in the same manner in a state in which the ultraviolet curable resin was not discharged, and it was checked whether or not the burr was present after cutting.

Table 1 illustrates results of observation performed on 10 samples for each length of the tailing portion 14 for Example 1 and Comparative Example 1.

TABLE 1

| | Maximum tailing length $x_1$ (mm) in case where burrs are not generated | Tailing length (mm) | Cutting protection layer | Whether or not burr is generated |
|---|---|---|---|---|
| Example 1 (D90 = 12 (μm)) (linear pressure 1.8 (t/cm)) | 0.8 | 0.6 | Not present | Not generated |
| | | 0.8 | Present | Not generated |
| | | 1.6 | Present | Not generated |
| | | 2 | Present | Not generated |
| Comparative Example 1 | | 0.8 | Not present | Small amount of generation |
| | | 1.6 | Not present | Large amount of generation |
| | | 2 | Not present | Large amount of generation |
| Comparative Example 4 (D90 = 10 (μm)) | | | | Not generated |

TABLE 1-continued

| | Maximum tailing length $x_1$ (mm) in case where burrs are not generated | Tailing length (mm) | Cutting protection layer | Whether or not burr is generated |
|---|---|---|---|---|
| Comparative Example 5 (linear pressure 1.4 (t/cm)) | | | | Not generated |

10 samples were observed, a case where the burrs were generated in samples the number of which was equal to or less than 3 was set to a small amount of generation, and a case where the burrs were generated in samples the number of which was equal to or larger than 4 was set to a large amount of generation.

No burr was observed in the electrode sheet 10 produced using the manufacturing method of Example 1, and, in contrast, the burr was observed in the electrode sheet 10 produced using the manufacturing method of Comparative Example 1.

Example 2

In the manufacturing method of Example 1, the electrode sheet 10 was produced in the same manner in a state in which the ultraviolet curable resin was not discharged while the detector of the tailing portion 14 of the slurry application machine was operated. In the same aluminum foil roll, the detected largest length of the tailing portion 14 was 2 mm.

Further, based on the maximum value of the length of the tailing portion 14, it was calculated that the radius r of the compression roll of an appropriate pressurizing compression device was 369 mm, by using the above Equation (2). The pressurizing compression was performed on the electrode sheet 10 using a pressurizing compression device provided with a compression roller having a roll radius r of 375 mm, instead of the pressurizing compression device of Example 1. Subsequently, the electrode sheet 10 was cut using the same cutting device as in Example 1, and 10 samples were observed for each length of the tailing portion 14, and it was checked whether or not the burr was present. Table 2 illustrates results of observation performed on 10 samples for each length of the tailing portion 14 for Example 2 and Comparative Example 1.

TABLE 2

| | Tailing length (mm) | Minimum roll diameter (mm) where burr is not generated | Roll diameter (mm) | Compression linear pressure (t/cm) | Roller compression pressure (Mpa) | Whether or not burr is generated |
|---|---|---|---|---|---|---|
| Example 2 | 1.6 | 327 | 375 | 2.2 | 23 | Not generated |
| | 2 | 369 | | | | Not generated |
| Comparative Example 1 | 1.6 | 288 | 250 | 1.8 | 19 | Large amount of generation |
| | 2 | 327 | | | | Large amount of generation |

No burr was observed in the electrode sheet 10 produced using a manufacturing method of Example 2, and, in contrast, the burr was observed in the electrode sheet 10 produced using the manufacturing method of Comparative Example 1.

Comparative Example 2

The electrode sheet was produced using the same method as in Comparative Example 1, except that the minimum thickness of the one-side active material layer after pressurizing compression was performed was 84.8 μm, and it was checked whether or not the burr was present.

Comparative Example 3

The electrode sheet 10 was produced using the same method as in Comparative Example 1 except that the thickness of the aluminum foil used was 15 μm, and it was checked whether or not the burr was present.

Table 3 illustrates results of observation performed on 10 samples for each of the length of the tailing portion 14 for Comparative Examples 1 to 3.

TABLE 3

| | Maximum tailing length $x_1$ (mm) where burr is not generated | Tailing length (mm) | Minimum thickness $t_{min}$ (μm) of active material layer on one side after pressurizing compression | Thickness (μm) of foil | Whether or not burr is generated |
|---|---|---|---|---|---|
| Comparative Example 1 | 0.8 | 1.6 | 62.6 | 12 | Large amount of generation |
| | | 2 | | 12 | Large amount of generation |
| Comparative Example 2 | 1.7 | 1.6 | 84.8 | 12 | Not generated |
| Comparative Example 3 | 0.8 | 1.6 | 62.6 | 15 | Small amount of generation |

No burr was observed in the electrode sheet 10 produced using the manufacturing method of Comparative Example 2, and a small amount of burrs were generated in the electrode sheet 10 produced using the manufacturing method of Comparative Example 3, compared to the electrode sheet 10 produced by using the manufacturing method of Comparative Example 1.

Comparative Example 4

The electrode sheet 10 was produced using the same method as in Example 1 except that an active material, in which a 90% cumulative diameter (D90) acquired from the particle size distribution measurement value was 10 μm, was used, and it was checked whether or not the burr was present. Note that, in Example 1, a relationship, in which D90=12 μm, the thickness d of the metal foil 9=12 μm, and D90≥d, is satisfied.

In Comparative Example 4, although a relationship, in which D90 (10 μm)<d(12 μm) and D90≥d, is not satisfied, in this case, the amount in which the active material particles bit into the metal foil 9 was small, with a result that the above-described problem did not occur, and thus generation of the burr was not found. (Table 1)

Comparative Example 5

The electrode sheet 10 was produced using the same method as in Example 1 except that a load applied to the central portion of the application area 11 was 1.4 t/cm in the compression step, and it was checked whether or not the burr was present. Note that, in Example 1, the linear pressure was 1.8 t/cm, and the linear pressure exceeded 1.5 t/cm.

In Comparative Example 5, although the linear pressure was less than 1.5 t/cm, the amount in which the active material particles bit into the metal foil 9 was also small in this case, with the result that the above-described problem did not occur, and thus the generation of burr was not found. (Table 1)

Hereinabove, although the present invention has been described with reference to the example embodiments and the examples, the present invention is not limited to the example embodiments and the examples. In the configurations and details of the present invention, various changes that can be understood by those skilled in the art are possible within the scope of the present invention.

Although some or entirety of the above example embodiments are described as in the following supplementary notes, the present invention is not limited thereto.

1. A current collector electrode sheet, in which an active material is applied to both surfaces of a sheet-shaped metal foil, the current collector electrode sheet including:
   a slurry application area formed by intermittently applying and drying a slurry containing the active material, and a non-application area, on the both surfaces of the metal foil,
   in which the application area and the non-application area are alternately formed in a winding direction of the metal foil having a strip shape, and in a compression step of continuously compressing the slurry application area and the non-application area using a pair of compression rollers in a thickness direction of the current collector electrode sheet, an area, which is not compressed by the compression rollers, is present in a tailing portion at a terminal end of each application area.

2. A method of manufacturing the current collector electrode sheet, in which an active material is applied to both surfaces of a sheet-shaped metal foil, the method including:
   an application step of alternately forming a slurry application area, on which an active material layer is continuously present, and a slurry non-application area in a winding direction of the metal foil having a strip shape by intermittently applying and drying a slurry containing the active material over the metal foil having a strip shape,
   a first detection step of detecting a length of the tailing portion at a terminal end of each application area formed in the application step,
   a compression step of continuously compressing the slurry application area and the non-application area using a pair of compression rollers in a thickness direction of the metal foil on which the active materiel layer is formed, and
   a cutting step of continuously cutting the slurry application area and the non-application area to be parallel with the winding direction of the metal foil on which the active material layer is formed through the first detection step and the compression step,
   in which the first detection step includes
   detecting the tailing portion which is formed continuously from the terminal end of the slurry application area to the non-application area and which satisfies the following Equation (A), $$x \geq (2rt_{min} - t_{min}^2)^{1/2} - y_{max} - z_{max} - w_{max} \quad \text{Equation (A)},$$

in which, x is a maximum value of the length of the tailing portion at the terminal end of each application area in the application step, r is a roll diameter of the compression roller used in the compression step, $t_{min}$ is a minimum value of an assumed thickness acquired after pressurizing compression is performed in a central portion of each application area continuously formed in the application step, $y_{max}$ is a maximum value of a discrepancy amount of an application start position between both surfaces of the metal foil in the winding direction of the metal foil, $z_{max}$ is a maximum value of a discrepancy amount of an application length of the active material on both surfaces of the metal foil in the winding direction of the metal foil, and $w_{max}$ is a maximum value of a distance from a coating terminal end of the active material on both surfaces of the metal foil to a portion where a thickness of a coating film becomes the same as a center of a coating area.

3. The method of manufacturing a current collector electrode sheet according to 2, in which in the detection step, a position, at which the tailing portion is detected, includes a position where cutting processing is performed in the cutting step and a peripheral portion of the position.

4. The method of manufacturing a current collector electrode sheet according to 2 or 3, in which the detection step is a step which is performed between the application step and the cutting step and includes a step of forming a protective layer for the tailing portion detected in the detection step.

5. The method of manufacturing a current collector electrode sheet according to 2 or 3, further including:

a step, subsequent to the detection step, of performing marking processing on the application area including the tailing portion detected in the detection step.

6. The method of manufacturing a current collector electrode sheet according to 5, further including:

a second detection step of detecting a position of the marking before producing an electrochemical device using an electrode produced through the cutting step, and a step of excluding the electrode, which includes a marking detected in the second detection step and is acquired after the cutting step, from a target member for producing the electrochemical device.

7. A method of manufacturing a current collector electrode sheet in which an active material is applied to both surfaces of a sheet-shaped metal foil, the method includes an application step of alternately forming a slurry application area, on which an active material layer is continuously present, and a slurry non-application area in a winding direction of the metal foil having a strip shape by intermittently applying and drying a slurry containing the active material over the metal foil having a strip shape, a detection step of detecting a length of a tailing portion at a terminal end of each application area formed in the application step, a compression step of continuously compressing the slurry application area and the non-application area using a pair of compression rollers in a thickness direction of the metal foil on which the active materiel layer is formed through the application step and the detection step, and a cutting step of continuously cutting the slurry application area and the non-application area to be parallel with the wingding direction of the metal foil on which the active material layer is formed through the detection step and the compression step.

in which the compression step includes performing compression using a compression roller having a roll radius r that satisfies the following Equation (B)

$$r \geq t_{min}/2 + (x_{max} + y_{max} + z_{max} + w_{max})^2/(2t_{min})$$  Equation (B).

in which, $t_{min}$ is a minimum value of an assumed thickness after pressurizing compression is performed at a central portion of each application area continuously formed in the application step, $x_{max}$ is a maximum value of the length of the tailing portion at the terminal end of each application area continuously formed in the application step, the length of the tailing portion being detected in the detection step, $y_{max}$ is a maximum value of a discrepancy amount of an application start position of the active material between both surfaces of the metal foil, $z_{max}$ is a maximum value of a discrepancy amount of an application length of the active material on both surfaces of the metal foil in the winding direction of the metal foil, and $w_{max}$ is a maximum value of a distance from a coating terminal end of the active material on both surfaces of the metal foil to a portion where a thickness of a coating film becomes the same as a center of a coating area.

8. The method of manufacturing a current collector electrode sheet according to any one of 2 to 7, in which the electrode sheet is produced using a lithium metal composite oxide as the active material.

9. The method of manufacturing a current collector electrode sheet according to any one of 2 to 8, in which in a case where a thickness of the metal foil is denoted by d, particles are arranged in order from a particle having a smallest particle diameter among measured active material particles when measurement is performed using a particle size analyzer, and a diameter of the particle corresponding to 90% of the measured particles is denoted by D90, the electrode sheet is produced using the metal foil and the active material which satisfy a relationship of D90≥d.

10. The method of manufacturing a current collector electrode sheet according to any one of 2 to 9, in which in the compression step, a load applied to a central portion of the application area in the metal foil, on which the active material layer is formed, exceeds 1.5 ton/cm.

11. A current collector electrode sheet manufactured by using the method of manufacturing a current collector electrode sheet according to any one of 2 to 10.

12. A battery manufactured by using the current collector electrode sheet of 1 or 11.

This application claims priority based on Japanese Patent Application No. 2017-202718 filed on Oct. 19, 2017, the entirety of the disclosure of which is incorporated herein.

The invention claimed is:

1. A method of manufacturing a current collector electrode sheet in which an active material is applied to both surfaces of a sheet-shaped metal foil, the method comprising:

an application step of alternately forming a slurry application area, on which an active material layer is continuously present, and a slurry non-application area in a winding direction of the metal foil having a strip shape by intermittently applying and drying a slurry containing the active material over the metal foil having a strip shape;

a first detection step of detecting a length of a tailing portion at a terminal end of each application area formed in the application step;

a compression step of continuously compressing the slurry application area and the non-application area using a pair of compression rollers in a thickness direction of the metal foil on which the active materiel layer is formed; and a cutting step of continuously cutting the slurry application area and the non-application area to be parallel with the winding direction of the metal foil on which the active material layer is formed through the first detection step and the compression step, wherein the first detection step includes detecting the tailing portion which is formed continuously from the terminal end of the slurry application area to the non-application area and which satisfies the following Equation (A), $$x \leq (2r t\min - t_{min}^2)^{1/2} - y_{max} - z_{max} - w_{max} \qquad \text{Equation (A),}$$

wherein, x is a maximum value of the length of the tailing portion at the terminal end of each application area in the application step, r is a roll diameter of the compression roller used in the compression step, $t_{min}$ is a minimum value of an assumed thickness acquired after pressurizing compression is performed in a central portion of each application area successively formed in the application step, $y_{max}$ is a maximum value of a discrepancy amount of an application start position between both surfaces of the metal foil in the winding direction of the metal foil, $z_{max}$ is a maximum value of a discrepancy amount of an application length of the active material on both surfaces of the metal foil in the winding direction of the metal foil, and $w_{max}$ is a maximum value of a distance from a coating terminal end of the active material on both surfaces of the metal foil to a portion where a thickness of a coating film becomes the same as a center of a coating area.

2. The method of manufacturing the current collector electrode sheet according to claim 1, wherein, in the detection step, a position, at which the tailing portion is detected, includes a position where cutting processing is performed in the cutting step and a peripheral portion of the position.

3. The method of manufacturing the current collector electrode sheet according to claim 1, wherein the detection step is a step which is performed between the application step and the cutting step and includes a step of forming a protective layer for the tailing portion detected in the detection step.

4. The method of manufacturing the current collector electrode sheet according to claim 1, further comprising:

a step, subsequent to the detection step, of performing marking processing on the application area including the tailing portion detected in the detection step.

5. The method of manufacturing the current collector electrode sheet according to claim 4, further comprising:

a second detection step of detecting a position of the marking before producing an electrochemical device using an electrode produced through the cutting step; and a step of excluding the electrode, which includes a marking detected in the second detection step and is acquired after the cutting step, from a target member for producing the electrochemical device.

6. The method of manufacturing the current collector electrode sheet according to claim 1, wherein the current collector electrode sheet is produced using a lithium metal composite oxide as the active material.

7. The method of manufacturing the current collector electrode sheet according to claim 1, wherein, in a case where a thickness of the metal foil is denoted by d, particles are arranged in order from a particle having a smallest particle diameter among measured active material particles when measurement is performed using a particle size analyzer, and a diameter of the particle corresponding to 90% of the measured particles is denoted by D90, the current collector electrode sheet is produced using the metal foil and the active material which satisfy a relationship of D90≥d.

8. The method of manufacturing the current collector electrode sheet according to claim 1, wherein, in the compression step, a load applied to a central portion of the application area in the metal foil, on which the active material layer is formed, exceeds 1.5 ton/cm.

9. The method of manufacturing the current collector electrode sheet according to claim 2, wherein the detection step is a step which is performed between the application step and the cutting step and includes a step of forming a protective layer for the tailing portion detected in the detection step.

10. The method of manufacturing the current collector electrode sheet according to claim 3, further comprising:

a step, subsequent to the detection step, of performing marking processing on the application area including the tailing portion detected in the detection step.

11. The method of manufacturing the current collector electrode sheet according to claim 10, further comprising:

a second detection step of detecting a position of the marking before producing an electrochemical device using an electrode produced through the cutting step; and a step of excluding the electrode, which includes a marking detected in the second detection step and is acquired after the cutting step, from a target member for producing the electrochemical device.

12. A method of manufacturing a current collector electrode sheet in which an active material is applied to both surfaces of a sheet-shaped metal foil, the method comprising:

an application step of alternately forming a slurry application area, on which an active material layer is continuously present, and a slurry non-application area in a winding direction of the metal foil having a strip shape by intermittently applying and drying a slurry containing the active material over the metal foil having a strip shape;

a detection step of detecting a length of a tailing portion at a terminal end of each application area formed in the application step;

a compression step of continuously compressing the slurry application area and the non-application area using a pair of compression rollers in a thickness direction of the metal foil on which the active materiel layer is formed through the application step and the detection step; and a cutting step of continuously cutting the slurry application area and the non-application area to be parallel with the wingding direction of the metal foil on which the active material layer is formed through the detection step and the compression step,
wherein the compression step includes
performing compression using a compression roller having a roll radius r that satisfies the following Equation (B), $$r \geq t_{min}/2 + (x_{max} + y_{max} + z_{max} + w_{max})^2/(2t_{min}) \quad \text{Equation (B)},$$

wherein, $t_{min}$ is a minimum value of an assumed thickness after pressurizing compression is performed at a central portion of each application area successively formed in the application step, $X_{max}$ is a maximum value of the length of the tailing portion at the terminal end of each application area successively formed in the application step, the length of the tailing portion being detected in the detection step, $y_{max}$ is a maximum value of a discrepancy amount of an application start position of the active material between both surfaces of the metal foil, $z_{max}$ is a maximum value of a discrepancy amount of an application length of the active material on both surfaces of the metal foil in the winding direction of the metal foil, and $w_{max}$ is a maximum value of a distance from a coating terminal end of the active material on both surfaces of the metal foil to a portion where a thickness of a coating film becomes the same as a center of a coating area.

13. The method of manufacturing the current collector electrode sheet according to claim 12,
wherein the current collector electrode sheet is produced using a lithium metal composite oxide as the active material.

14. The method of manufacturing the current collector electrode sheet according to claim 12,
wherein, in a case where a thickness of the metal foil is denoted by d,
particles are arranged in order from a particle having a smallest particle diameter among measured active material particles when measurement is performed using a particle size analyzer, and a diameter of the particle corresponding to 90% of the measured particles is denoted by D90, the current collector electrode sheet is produced using the metal foil and the active material which satisfy a relationship of D90≥d.

15. The method of manufacturing the current collector electrode sheet according to claim 12,
wherein, in the compression step, a load applied to a central portion of the application area in the metal foil, on which the active material layer is formed, exceeds 1.5 ton/cm.

* * * * *